(12) United States Patent
Sarma et al.

(10) Patent No.: US 8,972,232 B2
(45) Date of Patent: Mar. 3, 2015

(54) SYSTEM AND METHOD FOR MODELING A SUBTERRANEAN RESERVOIR

(75) Inventors: Pallav Sarma, San Ramon, CA (US); Wen Chen, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 111 days.

(21) Appl. No.: 13/029,534

(22) Filed: Feb. 17, 2011

(65) Prior Publication Data

US 2012/0215511 A1  Aug. 23, 2012

(51) Int. Cl.
*G06G 7/48* (2006.01)
*G06G 7/50* (2006.01)
*G01V 99/00* (2009.01)

(52) U.S. Cl.
CPC .................................. *G01V 99/005* (2013.01)
USPC ................................................ 703/9; 703/10

(58) Field of Classification Search
CPC ..... G01V 11/00; G01V 99/00; G01V 99/005; G06F 17/5018; G06F 17/5009; G06F 17/5022; G06F 2217/16
USPC ....................................................... 703/9, 10
See application file for complete search history.

(56) References Cited

U.S. PATENT DOCUMENTS

| | | | |
|---|---|---|---|
| 4,969,130 A | 11/1990 | Wason | |
| 5,992,519 A | 11/1999 | Ramakrishnan | |
| 7,584,081 B2 | 9/2009 | Wen | |
| 8,032,345 B2 | 10/2011 | LeRavalec et al. | |
| 2002/0016703 A1 | 2/2002 | Barroux | |
| 2007/0118346 A1 | 5/2007 | Wen et al. | |
| 2007/0255500 A1 | 11/2007 | Pita | |
| 2007/0271077 A1 | 11/2007 | Kosmala et al. | |
| 2008/0065363 A1* | 3/2008 | Middya | 703/10 |
| 2009/0070086 A1 | 3/2009 | Le Ravalec et al. | |
| 2009/0157590 A1 | 6/2009 | Mijares | |

(Continued)

FOREIGN PATENT DOCUMENTS

| | | |
|---|---|---|
| EP | 1 975 879 A2 | 10/2008 |
| JP | H02-286899 | 11/1990 |
| KR | 10-20050037342 A | 4/2005 |

OTHER PUBLICATIONS

Xin Li. (Continuous Reservoir Model Updating by Ensemble Kalman Filter on Grid Computing Architectures, 2009).*

(Continued)

*Primary Examiner* — Kamini S Shah
*Assistant Examiner* — Andre Pierre Louis

(57) ABSTRACT

A computer-implemented reservoir prediction system, method, and software are provided for updating simulation models of a subterranean reservoir. An ensemble of reservoir models representing a subterranean reservoir having non-Gaussian characteristics is provided, along with reservoir data from the subterranean reservoir used to condition the ensemble of reservoir models. For each of the reservoir models in the ensemble of reservoir models, a constrained optimization with equality constraints and inequality constraints are solved using a constrained Kernel Ensemble Kalman Filter to obtain a constrained optimal solution. The constrained optimal solutions are assembled to update the ensemble of reservoir models. The updated ensemble of reservoir models are consistent with the reservoir data provided from the subterranean reservoir and the non-Gaussian characteristics of the subterranean reservoir are preserved.

20 Claims, 13 Drawing Sheets

(56) References Cited

U.S. PATENT DOCUMENTS

| | | |
|---|---|---|
| 2010/0198570 A1 | 8/2010 | Sarma et al. |
| 2011/0218737 A1 | 9/2011 | Gulati |
| 2012/0215511 A1 | 8/2012 | Sarma et al. |
| 2013/0338983 A1 | 12/2013 | Sarma et al. |
| 2014/0136165 A1 | 5/2014 | Sarma et al. |

OTHER PUBLICATIONS

Ralaivola et al. (Time Series Filtering, Smoothing and Learning using the Kernel Kalman Filter, 2005).*

Vabo et al. (Using the EnKF with Kernel Methods for Estimation of Non-Gaussian Variables, 9 pages , 2008).*

Aziz et al. (Petroleum Reservoir Simulation, 1979 (250 pages).*

Bernhard et al. teaches a (Nonlinear Component Analysis as a Kernel eigenvalue problem, 1998 (21 pages)).*

Aziz, K., Settari, A., Petroleum Reservoir Simulation, Chapman and Hall, 1979. pp. 260-297.

Evensen, Gier Sequential data assimilation with a nonlinear quasi-geostrophic model using Monte Carlo methods to forecast error statistics. Journal of Geophysical Research, vol. 99. No. C5, May 15, 1994.

Evensen, Gier "The Ensemble Kalman Filter: theoretical formulation and practical implementation", 2003, Ocean Dynamics, vol. 53, pp. 343-367.

Gu, Y., Oliver, D.S., History Matching of the PUNQ-S3 Reservoir Model Using the Ensemble Kalman Filter, SPE Journal, 10, 217-224, 2005.

Kwok, J.T., Tsang, I.W., The Pre-Image Problem with Kernel Methods, IEEE Transactions in Neural Networks, 15, 1517-1525, 2004.

Li, G., Reynolds, A.C., An Iterative Ensemble Kalman Filter for Data Assimilation, paper SPE 109808 presented at the SPE Annual Technical Conference and Exhibition, Anaheim, CA, 2007.

Naevdal, G., Johnsen, L.M., Aanonsen, S.I., Vefring, E.H., Reservoir Monitoring and Continuous Model Updating Using Ensemble Kalman Filter, SPE paper 84372 presented at the SPE Annual Technical Conference and Exhibition, Denver, CO, 2003.

Naevdal, G., Mannseth, T., Vefring, E.H., Near-Well Reservoir Monitoring Through Ensemble Kalman Filter, paper SPE 75235 presented at the SPE/DOE Improved Oil Recovery Symposium, Tulsa, OK, 2002.

Sarma, P., Durlofsky, L., Aziz, K., A New Approach to Automatic History Matching using Kernel PCA, paper SPE 106176 presented at the SPE Reservoir Simulation Symposium, Houston, TX, 2006.

Sarma, P., Durlofsky, L.J., Aziz, K., Kernel Principal Component Analysis for an Efficient, Differentiable Parameterization of Multipoint Geostatistics, Mathematical Geosciences, 40, 3-32, 2008.

Sarma, P., Efficient closed-loop optimal control of petroleum reservoir under uncertainties, Stanford University, Sep. 2006, 221 pages.

Schölkopf, B., Smola, A., Muller, K., Nonlinear Component Analysis as a Kernel Eigenvalue Problem, Neural Computation, 10, 1299-1319, 1998.

Schölkopf, B., Smola, A.J., Learning with Kernels, MIT Press, Cambridge, MA, 2002.

Skjervheim, J.A., Evensen, G., Aanonsen, S.I., Ruud, B.O., Johansen, T.A., Incorporating 4D Seismic Data in Reservoir Simulation Models Using Ensemble Kalman Filter, SPE Journal, 12, 282-292, 2007.

Strebelle, S., Conditional Simulation of Complex Geological Structures using Multiple-point Statistics, Mathematical Geology, 34, 1-22, 2002.

Wen, X.-H., Chen, W.H., Real-time Reservoir Model Updating Using Ensemble Kalman Filter, paper SPE 92991 presented at the SPE Reservoir Simulation Symposium, Houston, TX, 2005.

Zhang, T., Multiple Point Geostatistics: Filter-based Local Training Pattern Classification for Spatial Pattern Simulation, PhD Thesis, Stanford University, Stanford, CA, 2006.

PCT Notification of Transmittal of the International Search Report and the Written Opinion of the International Searching Authority or the Declaration regarding PCT/US2012/025357 dated Sep. 19, 2012 (9 pgs).

Non-Final Office Action mailed Aug. 1, 2012, during the prosecution of Co-Pending U.S. Appl. No. 12/657,929, with a filing date of Jan. 29, 2010.

Non-Final Office Action mailed Jun. 7, 2013, during the prosecution of Co-Pending U.S. Appl. No. 12/657,929, with a filing date of Jan. 29, 2010.

Non-Final Office Action mailed May 9, 2014, during the prosecution of Co-Pending U.S. Appl. No. 12/657,929, with a filing date of Jan. 29, 2010.

Non-Final Office Action mailed Jun. 5, 2014, during the prosecution of Co-Pending U.S. Appl. No. 13/843,096, with a filing date of Mar. 15, 2013.

Aanonsen, Sigurd I., et al; "The Ensemble Kalman Filter in Reservoir Engineering—a Review"; SPE Journal, Sep. 2009, pp. 393-412.

Fahimuddin, Abul, et al.; "4D Seismic History Matching of a Real Field Case with EnKF: Use of Local Analysis for Modeling Updating"; SPE 134894, 2010 SPE Annual Technical Conference and Exhibition in Florence, Tuscany, Italy, Sep. 20-22, 2010, SPE 134894, pp. 1-16.

Fahimuddin, Abul; "4D Seismic History Matching Using the Ensemble Kalman Filter (EnKF): Possibilities and Challenges"; Thesis, Mar. 2010, Title Page, Summary, Preface, Acknowledgements, and Table of Contents, Part 1.

Fahimuddin, Abul; "4D Seismic History Matching Using the Ensemble Kalman Filter (EnKF): Possibilities and Challenges"; Thesis, Mar. 2010, Chapters 1 and 2, Part 2.

Fahimuddin, Abul; "4D Seismic History Matching Using the Ensemble Kalman Filter (EnKF): Possibilities and Challenges"; Thesis, Mar. 2010, Chapters 3-4, Part 3.

Fahimuddin, Abul; "4D Seismic History Matching Using the Ensemble Kalman Filter (EnKF): Possibilities and Challenges"; Thesis, Mar. 2010, Chapters 5-6, Part 4.

Fahimuddin, Abul; "4D Seismic History Matching Using the Ensemble Kalman Filter (EnKF): Possibilities and Challenges"; Thesis, Mar. 2010, Chapters 7-8, and Bibliography, Part 5.

Ott, Edward, et al.; "A Local Ensemble Kalman Filter for Atmospheric Data Assimilation"; Tellus, 2004, vol. 56A, pp. 415-428.

Srinivasan, Balaji Vasan; "Gaussian Process Regression for Model Estimation"; Thesis, 2008, University of Maryland.

International Search Report, issued on Aug. 25, 2010, during the prosecution of International Application No. PCT/US2010/022584.

Written Opinion of the International Searching Authority, issued on Aug. 25, 2010, during the prosecution of International Application No. PCT/US2010/022584.

International Search Report, issued on May 20, 2014, during the prosecution of International Application No. PCT/US2013/069808.

Written Opinion of the International Searching Authority, issued on May 20, 2014, during the prosecution of International Application No. PCT/US2013/069808.

International Search Report, issued on Jun. 25, 2014 during the prosecution of International Application No. PCT/US2013/045386.

Written Opinion of the International Searching Authority, issued on Jun. 25, 2014 during the prosecution of International Application No. PCT/US2013/045386.

International Search Report, issued on Sep. 19, 2012 during the prosecution of International Application No. PCT/US2012/025357.

Written Opinion of the International Searching Authority, issued on Sep. 19, 2012 during the prosecution of International Application No. PCT/US2012/025357.

* cited by examiner

SYSTEM AND METHOD FOR MODELING A SUBTERRANEAN RESERVOIR

TECHNICAL FIELD

This invention relates to the modeling of a subterranean reservoir, and more particularly, to a system, method, and computer program product for updating simulation models of a subterranean reservoir such as by utilizing kernel-based ensemble Kalman filters.

BACKGROUND

Integrating static and dynamic data during reservoir modeling and simulation processes can reduce the uncertainty of simulation models. For example, simulation models can be continuously updated with real time production data, such as reservoir fluid flow rates and reservoir pressure-volume-temperature (PVT) characteristics, to delineate the reservoir model description and flow parameters. This improves the predictive capacity of simulation models so that they can reliably forecast future extraction amounts, which in turn can lead to better reservoir management decisions.

The ensemble Kalman filter (EnKF) has recently generated significant attention as a promising method for conditioning reservoir simulation models to dynamic production data. The EnKF is particularly suited for real-time applications and continuous model updating as the EnKF incrementally updates reservoir models assimilating production data sequentially with time as it becomes available. The EnKF is computationally efficient because of its sequential approach to data assimilation, and also because it can be easily parallelized. The EnKF can typically also be applied to reservoir simulators without the need of complicated coding. The EnKF does not need optimization and sensitivity coefficients calculations. The EnKF provides an ensemble of models that reflect the most current production data and can be used to approximate the posterior distribution of simulation model outputs. The performance predictions of the ensemble of reservoir models can further be used in optimization studies.

Despite the above advantages, application of the EnKF is generally only technically appropriate for multi-Gaussian random fields. In particular, the updated ensemble obtained using the EnKF is a linear combination of the forecasted ensemble. The EnKF only uses the covariance and cross-covariance between the random fields (to be updated) and observations, thereby only preserving two-point statistics. Application of the EnKF to complex non-Gaussian geological models can lead to modification of these models towards Gaussianity. As a result, although the updated simulation models may be in good agreement with the observed production data, the predictive capacity of the simulation models may be questionable. Accordingly, application of the EnKF is generally not appropriate for capturing realistic geology with complex patterns of continuity, such as channel systems, which are characterized by multipoint statistics or non-Gaussian random fields. Application of the EnKF also encounters problems related to constraint violations. Constraints on the state variables of the EnKF can be categorized into bound constraints, linear constraints, and nonlinear constraints. These constraints can further be categorized as either equality or inequality constraints.

With regards to bound constraints, the updating step in the EnKF can lead to non-physical updates of model states and other variables such as saturations. This is particularly common in highly nonlinear problems such as compositional simulations. One approach to handle bound constraints is through truncation; however, truncation may not work for highly nonlinear and non-Gaussian problems. Another approach is variable transformation. Variable transformation replaces the state variables of the EnKF with a linear or nonlinear transformation of those variables such that the new variables are not bounded. Therefore, the new variables are more Gaussian and can change from $-\infty$ to $\infty$, thereby making them more suited to the assumptions of the EnKF. However, variable transformation techniques are generally problem specific and require different transformations for different variables/problems. Furthermore, transformations are not applicable to nonlinear constraints, which can be a combination of many variables. Another approach is to utilize the simulator to handle all constraints on the state variables. However, this requires the use of iteration (iterative EnKF), which results in a substantial increase in computing cost and may not be appropriate for large-scale simulation models.

With regards to linear and nonlinear constraints, the inequality constraints, which are more dominant in practical data assimilation problems, are typically more difficult to satisfy compared to the equality constraints on the state variables. One proposed approach for satisfying inequality constraints is to determine which constraints are violated by running the standard EnKF (to a given assimilation step), and then adding one or more of the violated constraints to the observation vector as pseudo observations. The violated constraints are therefore treated as equality constraints during the next EnKF run, as the EnKF tries to match them in the update step along with the actual observations. This process of adding violated constraints as pseudo observations is repeated until none of the constraints are violated (to acceptable tolerance). While this approach is appealing and easy to implement, constraints violated at any iteration are always kept through succeeding iterations, thereby producing a suboptimal solution to the constrained EnKF problem. In particular, it is unnecessary that constraints violated in earlier iterations be violated in the final solution, as this implies that some constraints that are actually inactive at the final solution are treated as active. Furthermore, by treating constraints as observations there is no guarantee that they will be satisfied—just as there is no guarantee that observations will always be matched by the EnKF. Accordingly, if there are certain constraints that are required to be satisfied, such an approach may not work.

Kernel methods provide an elegant approach to create efficient nonlinear generalizations of linear algorithms. For example, kernel principle component analysis (kernel PCA) has been used to parameterize non-Gaussian random fields, which then can be combined with optimization methods for efficient history matching while preserving geological realism. Kernel methods have also been applied to create nonlinear generalizations of the EnKF, which can represent non-Gaussian random fields characterized by multi-point statistics. As disclosed herein, such kernel methods are referred to as the Kernel EnKF (KEnKF).

Kernel EnKF (KEnKF) includes deriving the EnKF in a high-dimensional feature space that is implicitly defined using kernels such that both the Kalman gain and update equations are nonlinearized. Accordingly, a completely general nonlinear set of EnKF equations is produced where the nonlinearity is controlled by the kernel. The feature space and associated kernel are chosen such that it is more appropriate to apply the EnKF in this space rather than in the input space. For example, high order polynomial kernels can be used to preserve the geological realism of the updated random fields characterized by multi-point statistics. Kernel methods have also been used for better handling of nonlinear likelihood models with the EnKF.

While the KEnKF can better reproduce complex geology compared to the standard EnKF, such as when updating permeability using production data, a robust and efficient method for handling model constraints is needed for the KEnKF.

SUMMARY

A computer-implemented method for updating simulation models of a subterranean reservoir is disclosed. The method includes providing an ensemble of reservoir models representing a subterranean reservoir having non-Gaussian characteristics, and providing reservoir data from the subterranean reservoir. For each of the reservoir models in the ensemble of reservoir models, a constrained optimization with equality constraints and inequality constraints is solved to obtain a constrained optimal solution. The constrained optimal solutions are assembled to update the ensemble of reservoir models. The updated ensemble of reservoir models are consistent with the reservoir data provided from the subterranean reservoir and the non-Gaussian characteristics of the subterranean reservoir are preserved.

In some embodiments, the method includes using a generalized ensemble Kalman filter represented by a kernel function, such as a polynomial kernel function.

In some embodiments, the method includes using a fixed-point iteration scheme with successive over relaxation.

In some embodiments, the method includes using an augmented Lagrangian method. The augmented Lagrangian method can utilize Lagrange multipliers that correspond to the equality constraints and inequality constraints.

In some embodiments, the ensemble of reservoir models is represented by an initial state vector of static parameters and dynamic state variables. The initial state vector is forecasted forward, up to when the reservoir data from the subterranean reservoir is available for assimilation, to compute a forecasted state vector. The forecasted state vector is mapped to a feature space. The forecasted state vector in the feature space is updated based upon the reservoir data from the subterranean reservoir. Inverse mapping is performed to map the updated forecasted state vector in the feature space back to the original space.

In some embodiments, the method includes forecasting the production performance of the subterranean reservoir responsive to the updated ensemble of reservoir models.

In some embodiments, the method includes transforming the updated ensemble of reservoir models into image data representations of the subterranean reservoir.

According to another aspect of the present invention, a system for updating simulation models of a subterranean reservoir is disclosed. The system includes a database, a computer processor, and a software program. The database is configured to store data comprising reservoir data from a subterranean reservoir having non-Gaussian characteristics and an ensemble of reservoir models representing the subterranean reservoir. The computer processor is configured to receive the stored data from the database, and to execute software responsive to the stored data. The software program is executable on the computer processor. The software program comprises an Ensemble Kalman Filter module configured to update the ensemble of reservoir models by assembling constrained optimal solutions obtained by solving a constrained optimization with equality constraints and inequality constraints for each of the reservoir models in the ensemble of reservoir models. The updated ensemble of reservoir models is consistent with the reservoir data from the subterranean reservoir and the non-Gaussian characteristics of the subterranean reservoir are preserved.

In some embodiments, the Ensemble Kalman Filter module solves the constrained optimization with equality constraints and inequality constraints using a generalized ensemble Kalman filter represented by a kernel function, such as a polynomial kernel function.

In some embodiments, the ensemble of reservoir models is represented by an initial state vector of static parameters and dynamic state variables. The Ensemble Kalman Filter module is configured to forecast forward, up to when the reservoir data from the subterranean reservoir is available for assimilation, the initial state vector to compute a forecasted state vector. The forecasted state vector is mapped to a feature space. The forecasted state vector in the feature space is updated based upon the reservoir data from the subterranean reservoir. Inverse mapping is performed to map the updated forecasted state vector in the feature space back to the original space.

In some embodiments, the Ensemble Kalman Filter module solves the constrained optimization with equality constraints and inequality constraints using a fixed-point iteration scheme with successive over relaxation.

In some embodiments, the Ensemble Kalman Filter module solves the constrained optimization with equality constraints and inequality constraints using an augmented Lagrangian method. The augmented Lagrangian method includes Lagrange multipliers that correspond to the equality constraints and inequality constraints.

In some embodiments, the Ensemble Kalman Filter module is further configured to forecast production performance of the subterranean reservoir responsive to the updated ensemble of reservoir models.

In some embodiments, the system further comprises a display that communicates with the Ensemble Kalman Filter module of the software program such that the updated ensemble of reservoir models is transformed into image data representations of the subterranean reservoir, which are displayed on the display.

According to another aspect of the present invention, a computer program product is disclosed. The computer program product comprises computer usable medium having a computer readable program code embodied therein. The computer readable program code comprises an Ensemble Kalman Filter module configured to update an ensemble of reservoir models by assembling constrained optimal solutions obtained by solving a constrained optimization with equality constraints and inequality constraints for each of the reservoir models in the ensemble of reservoir models. The updated ensemble of reservoir models is consistent with reservoir data from the subterranean reservoir and the non-Gaussian characteristics of the subterranean reservoir are preserved.

In some embodiments, the Ensemble Kalman Filter module solves the constrained optimization with equality constraints and inequality constraints using a generalized ensemble Kalman filter represented by a polynomial kernel function.

In some embodiments, the Ensemble Kalman Filter module solves the constrained optimization with equality constraints and inequality constraints using a fixed-point iteration scheme with successive over relaxation and an augmented Lagrangian method. The augmented Lagrangian method includes Lagrange multipliers that correspond to the equality constraints and inequality constraints.

DETAILED DESCRIPTION

Figure 1:
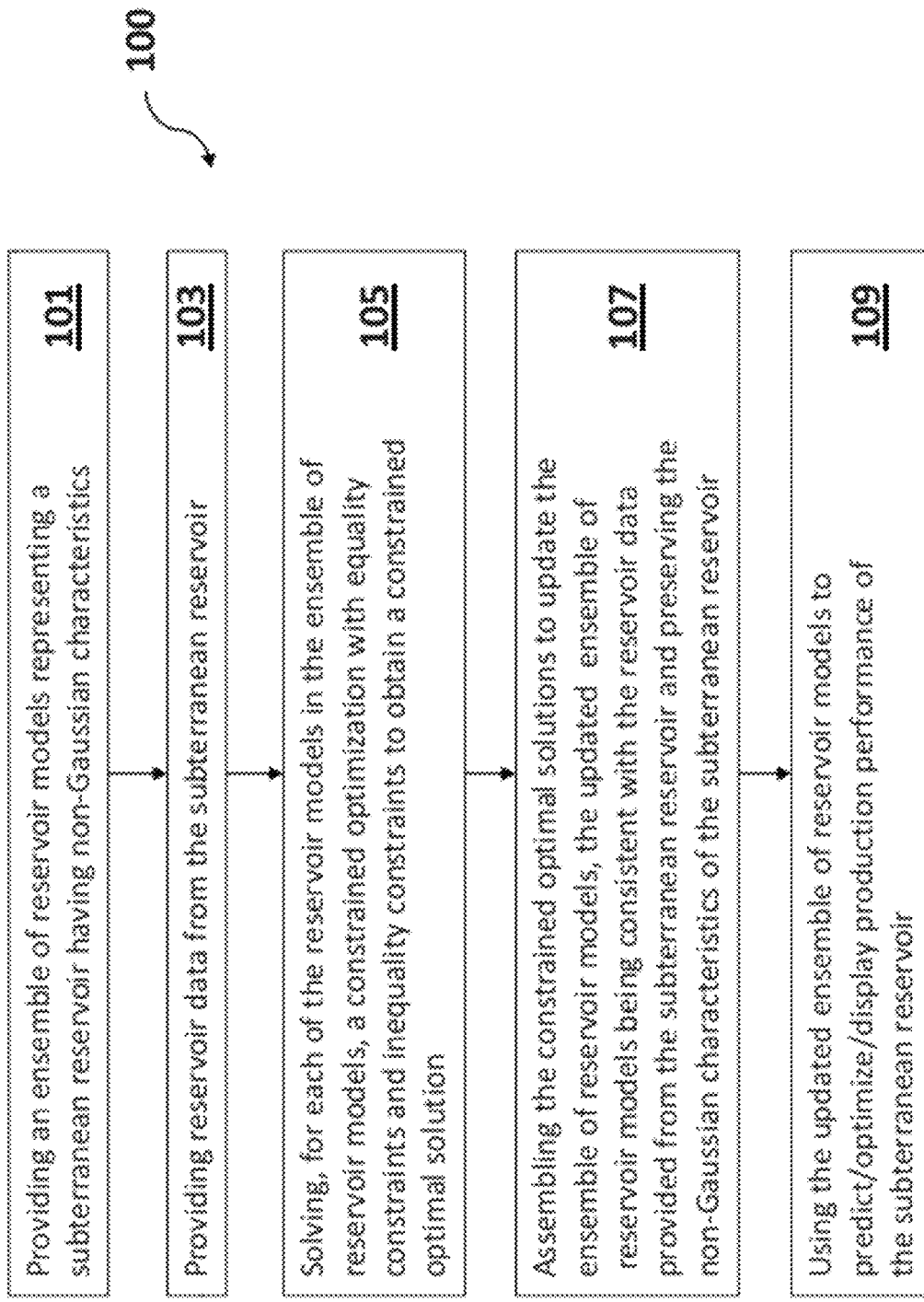
FIG. 1 is a flow diagram showing a computer-implemented method for updating reservoir simulation models, according to an embodiment of the present invention.

Embodiments of the present invention relate to a generalized EnKF method using kernels (KEnKF) that can represent non-Gaussian random fields characterized by multipoint geostatistics. Moreover, embodiments of the present invention are directed to efficiently handling constraints on the state variables, and other variables, of the simulation model arising from physical or other reasons. The Kalman update equation is solved as a minimization problem such that constraints can be easily and rigorously handled via solution of a constrained optimization or nonlinear programming problem. As used herein, constrained optimization refers to the minimization or maximization of an objective function subject to constraints, such as equalities and inequalities. A combination of fixed point iteration and an augmented Lagrangian method is utilized for solving this problem efficiently. In some embodiments of the present invention, constraints can be handled even though higher order kernels are not used.

The Ensemble Kalman Filter

The traditional ensemble Kalman filter (EnKF) is a temporally sequential data assimilation method. In particular, each assimilation time includes a forecast step (evaluation of the dynamic system), followed by a data assimilation step, which includes the calculation of Kalman gain followed by an update of the state variables of the EnKF (Kalman update).

The state variables of the EnKF usually include static variables, dynamic variables, and production data. Examples of static variables include permeability and porosity fields. Dynamic variables can include pressure and saturation. Production data can include production and injection rates and bottom-hole pressures. The state vector of the EnKF at a given assimilation time can be written as:

$$y_j = \begin{bmatrix} m \\ x \\ d \end{bmatrix}_j \forall j = 1, \ldots, M \quad \text{Equation (1)}$$

Here, $y_j \in R^{N_s}$ is the $j^{th}$ ensemble member, m are the static variables, x are the dynamic variables, and $d \in R^{N_d}$ are the production data to be assimilated. The number of ensemble members is M. Before the EnKF can be applied, an initial ensemble of the static and dynamic variables has to be created. Usually, geostatistical techniques are used to create the ensemble of static variables corresponding to prior knowledge of the geology and hard data. The dynamic variables are usually considered known without uncertainty, as the reservoir is generally in dynamic equilibrium before start of production and the uncertainty of the dynamic variables at the initial time is smaller compared to that of the static variables. However, one skilled in the art will appreciate that the initial dynamic variables can be reflected through the initial ensemble if they are considered uncertain. There is usually no production data available initially.

Once the initial ensemble is created, the forecast step can be performed, wherein the dynamic system, or reservoir simulation model, is evaluated to the next assimilation time using the current estimates of the static and dynamic variables. The simulator is run once for each ensemble member (M times). This provides the forecasted dynamic variables and production data at the next assimilation step. The step can be written compactly as:

$$y_{j,k}^f = f(y_{j,k-1}^u) \forall j = 1, \ldots, M \quad \text{Equation (2)}$$

where $y^f$ is the forecasted state vector obtained after the forecast step, $y^u$ is the updated state vector obtained after the Kalman update, subscript k stands for the assimilation time, and f represents the reservoir simulation equations. The assimilation time subscript k is removed from discussions below for simplicity.

After the forecasted state vector is obtained, the data assimilation step is performed, wherein, the Kalman gain is calculated using the static variables, dynamic variables and production data obtained from the forecast step. The Kalman gain can be written as:

$$K_g = C_y^f H^T (H C_y^f H^T + C_e)^{-1} \quad \text{Equation (3)}$$

Here, $K_g$ is known as the Kalman gain matrix and is of size $N_s \times N_d$, and $C_y^f$ is the covariance matrix of $y^f$. Matrix $H = [0|I]$, where 0 is a $N_d \times (N_s - N_d)$ matrix of zeros, and I is a $N_d \times N_d$ identity matrix. $C_e$ is the error covariance matrix of the production data d which is usually assumed to be diagonal as data measurement errors are independent of each other. Therefore, $C_y^f H^T$ is the covariance matrix of the full forecasted state vector $y^f$ with the forecasted production data d and $HC_y^f H^T = C_d^f$ is the covariance matrix of forecasted production data d with itself. Accordingly, defining the centered vectors, $\hat{y}^f = y^f - \bar{y}^f$ and $\hat{d} = d - \bar{d}$, gives:

$$C_y^f H^T = \frac{1}{M} \sum_{j=1}^{M} \hat{y}_j^f \hat{d}_j^T \qquad \text{Equation (4)}$$

$$HC_y^f H^T = \frac{1}{M} \sum_{j=1}^{M} \hat{d}_j \hat{d}_j^T \qquad \text{Equation (5)}$$

The final step of the EnKF is to update the state variables using the actual observations, which can be given as:

$$y_j^u = y_j^f + K_g(d_{o,j} - d_j) \qquad \text{Equation (6)}$$

where $d_o$ represents the observed production data. Random perturbations corresponding to $C_e$ are added to $d_o$ to create the ensemble of observed data, $d_{o,j}$. The updated state vector $y^u$ can be used to evaluate the next forecast step, and the process is repeated for the next assimilation time.

Equation (6) shows that the updated state vectors are linear combinations of the forecasted state vectors. Further, because the EnKF is based on the covariance of the forecasted state vectors, it is only technically appropriate for multi-Gaussian random fields. In other words, the EnKF only preserves two-point statistics or the covariance of random fields. However, as previously described, preserving two-point statistics is not appropriate if the goal is to capture realistic geology with complex patterns of continuity, such as channel systems, which are characterized by multipoint statistics or non-Gaussian random fields. Furthermore, since the EnKF equations are a solution of an unconstrained minimization problem, as seen in Equation (6), the state vector $y^u$ is updated without any consideration to physical or other constraints on y. As a result, the updated state vector $y^u$ often violates constraints such as physical bounds, for example by producing negative saturations and compositions. Since negative saturations and compositions have no physical meaning, they are usually truncated to within their bounds as a post-processing step. Alternatively, more sophisticated techniques such as variable transformation can be applied to y as discussed above, however, most of these techniques are not general enough to be applicable to a general nonlinear inequality constraint.

Generalized EnKF Using Kernels (KEnKF)

The EnKF can be elegantly generalized to handle non-Gaussian random fields and multi-point statistics using kernel methods. Examples of KEnKF are presented in U.S. patent application Ser. No. 12/657,929, titled "System and Method for Predicting Fluid Flow in Subterranean Reservoirs," which is incorporated herein by reference in its entirety. The data in the input space $R^{N_s}$ is mapped to a so-called feature space F through a nonlinear map $\phi$, and a linear algorithm is applied in the feature space. The feature space F is chosen such that it is more appropriate to apply the linear algorithm in this space rather than in the input space $R^{N_s}$. This approach can be applied to any linear algorithm that can be expressed in terms of dot products without the explicit use of the variables themselves. By replacing the dot product in the feature space with an appropriate kernel function, efficiency similar to the linear algorithm can be achieved. Examples of the application of kernel methods to linear algorithms to create nonlinear generalizations include support vector machines, kernel-based clustering, and kernel principal component analysis (PCA). The kernel EnKF equations are described below.

The nonlinear map $\phi$ maps the input space $R^{N_s}$ (state space of the EnKF) to the feature space F. That is:

$$\phi: R^{N_s} \to F; Y = \phi(y); y \in R^{N_s}, Y \in F \qquad \text{Equation (7)}$$

where F is the feature space, which can have an arbitrarily large dimensionality $N^F$. Because state vector y includes different kinds of variables such as permeability, porosity, and saturation with possibly different random fields, it may not be appropriate to have a single mapping $\phi$ that operates on y as a whole. Therefore, the following mapping is considered:

$$\phi(y) = \begin{bmatrix} \phi_m(m) \\ \phi_x(x) \\ \phi_d(d) \end{bmatrix} \qquad \text{Equation (8)}$$

In some embodiments, the production data is not mapped to any feature space for the kernel-based EnKF (KEnKF) equations ($\phi_d(d) = d$), which implies that production data is multi-Gaussian. In other embodiments, the production data is extended to non-Gaussian production data as shown in Equation (8).

The KEnKF therefore includes the following:
1. Creating an ensemble of simulation models sampled from the prior distribution of static parameters and initial states of the dynamic variables.
2. Running the simulator on all ensemble members up to the first time when data is available for assimilation.
3. Creating a state vector $y_j^f$, called a forecasted state vector, using the static parameters, dynamic states and simulated observations obtained from the simulation.
4. Mapping the forecasted state vectors $y_j^f$ to a feature space F using $\phi$ to create the forecasted state vectors $Y_j^f$ in feature space.
5. Calculating a Kalman gain $\tilde{K}_g$ and updating the state vectors $Y_j^u$ in the feature space F.
6. Performing inverse mapping $y_j^u = \phi^{-1}(Y_j^u)$ to obtain state vectors the original space, and proceeding to next assimilation time.

For the KEnKF to be practically feasible, a mapping $\phi$ should be found that is appropriate for multi-point geostatistics honoring complex geological structures. Furthermore, it should be computationally tractable such that values, such as the covariance and Kalman gain, can be calculated in feature space F. An inverse mapping of $\phi$ should exist such that the updated state vectors $y_j^u$ can be calculated in the original space $R^{N_s}$ from $Y_j^u$. A discussion of such items can be found in U.S. patent application Ser. No. 12/657,929, titled "System and Method for Predicting Fluid Flow in Subterranean Reservoirs," which is incorporated herein by reference in its entirety.

As will be described below, the KEnKF is extended to handle general nonlinear constraints on the state vector y in the original space, according to an embodiment of the present invention.

Calculating Kalman Gain in Feature Space

The Kalman gain in feature space for the case when observations are not mapped to feature space can be written as:

$$A = \frac{1}{M} D^T (C_d^f + C_e)^{-1} \qquad \text{Equation (9)}$$

Here, $D=[\hat{d}_1, \ldots, \hat{d}_M]$ and $\hat{d}_j = d_j - \bar{d}$ are the centered observations, where $\bar{d}$ is the mean of all the observations vectors $d_j$. Equation (9) can be used as an alternative to the Kalman gain equation, as the Kalman update can be performed directly using A. The Kalman gain can be calculated from A, however, explicit calculation of the Kalman gain $\tilde{K}_g$ is not necessary in the feature space. Because the calculation of A only involves the production data d and its covariances, and because d is not mapped to any feature space but is in the original input space, A can be calculated very efficiently. In comparison, calculating the Kalman gain $\tilde{K}_g$ requires calculating the maps $\phi(y_j)$, $j=1, \ldots, M$. Because the dimension $N_F$ of $\phi(y)$ could be very large, it may be computationally intractable to calculate $\phi(y)$. Therefore, by working with A, explicitly calculating $\tilde{K}_g$ can be avoided.

Kalman Update as a Pre-Image Problem

Similar to the standard EnKF, the updated state vector $Y_j^u$ in the feature space is a linear combination of the $\phi$ maps of the forecasted state vectors in the feature space $\phi(y^f)$. However, the updated state vector $y_j^u$ in the original input space $R^{N_s}$ is needed instead of the updated state vector $Y_j^u$ in F. To obtain the updated state vector $y_j^u$ in the original input space $R^{N_s}$, which corresponds to the updated state vector $Y_j^u$ in F, an inverse map of $Y_j^u$ can be used, $y_j^u = \phi^{-1}(Y_j^u)$. This is known as the pre-image problem. However, due to the very large dimensionality of the feature space F, it may not be possible to calculate this pre-image. Furthermore, such a pre-image may not even exist, or, if it exists, it may be non-unique. These issues can be addressed by solving a minimization problem, in which a vector $y_j^u$ is sought such that the least-square error between $\phi(y)$ and $Y_j^u$ is minimized:

$$y_j^u = \arg\min_y \rho(y) \quad \text{Equation (10)}$$
$$= \|\phi(y) - Y_j^u\|^2$$
$$= \phi(y) \cdot \phi(y) - 2Y_j^u \cdot \phi(y) + Y_j^u \cdot Y_j^u$$

The dot products in the space F can be used to very efficiently calculate $\rho(y)$ with a kernel function:

$$\Phi(y_i) \cdot \Phi(y_j) = \psi(y_i, y_j) \quad \text{Equation (11)}$$

The kernel function $\Psi(y_i, y_j)$ calculates the dot product in space F directly from the elements of the input space $R^{N_s}$. The right hand side of Equation (11) does not directly involve the mapping $\phi(y)$. The minimum of the objective function $\rho(y)$, after replacing the dot products with the kernel function, can be obtained by setting its gradient to zero, which results in the following equation:

$$\frac{d\psi(y,y)}{dy} - 2\sum_{i=1}^{M} b_{ij} \frac{d\psi(y_i^f, y)}{dy} = 0 \quad \text{Equation (12)}$$
$$\forall j = 1, \ldots, M$$

Similar to the Kalman update equation, the solution of Equation (12) provides the updated state vectors $y_j^u$ in the input space. Here, $b_{ij}$ is related to the matrix A of Equation (9). Depending on the nature of the kernel function in Equation (12), $y^u$ can be a linear or nonlinear combination of the forecasted state vectors $y^f$. Furthermore, the outcome of Equation (12) is a generalization of the EnKF, because by choosing different kernel functions, different versions of the EnKF can be obtained.

Preserving Multi-Point Statistics Using Polynomial Kernels

The above section describes the development of the Kalman update equation in terms of kernel functions without specifying the form the kernel function itself. The polynomial kernel is an example of one of the various kinds of kernel functions that can be utilized:

$$(\Phi(y_i) \cdot \Phi(y_j)) = \psi(y_i, y_j) \quad \text{Equation (13)}$$
$$= \sum_{k=1}^{q} (y_i \cdot y_j)^k$$

Here, q is a positive integer defining the order of the kernel. This kernel allows the incorporation of up to the $2q^{th}$ order moments (two-point statistics) of the random field for which y are members. Thus, if the key features of y are represented by these higher order moments (or multi-point statistics), it becomes possible to preserve these during the Kalman update. Particularly, for q=1 the feature space F is the same as the input space $R^{N_s}$, and as a result, the kernel formulation of the EnKF reduces to the standard EnKF.

The solution of Equation (12) for the polynomial kernel of Equation (13) can be efficiently obtained using a fixed-point iteration scheme with successive over relaxation (SOR):

$$y^{n+1} = \frac{\theta}{1+\theta} y^n + \frac{1}{1+\theta} \frac{\sum_{i=1}^{M} b_{ij} \sum_{k=1}^{q} \psi(y_i^f \cdot y^n)^{k-1} y_i^f}{\sum_{k=1}^{q} \psi(y^n \cdot y^n)^{k-1}} \quad \text{Equation (14)}$$
$$\forall j = 1, \ldots, M$$

where $\theta$ is the relaxation parameter. Equation (14) is used for updating the state vectors. A larger relaxation parameter, such as $\theta=6$, gives more weight to the last iterate $y^n$ and is generally more stable, but takes more iterations to converge. In terms of efficiency, Equation (14) is more expensive to solve than the standard Kalman update equation due to its iterative nature. However, because the solution of Equation (14) itself does not involve the solution of the forward simulator as is needed in the forecast step in the Kalman update equation, the overall efficiency is not much affected as running the reservoir simulator is likewise as expensive.

Although a polynomial kernel is shown as an example above, the present invention is not limited to this type of kernel function. For example, the application of other kernel functions satisfying Mercer's theorem can potentially be used and are within the scope of the present invention, including radial basis functions (RBFs), exponential, and sigmoid kernels.

Handling General Constraints with the Kernel EnKF

As shown in Equation (10), the kernel formulation of the EnKF results in the formulation of the Kalman update equation as an unconstrained minimization problem. As a result, general constraints on the state variables of the EnKF can be handled by including these constraints during the solution of the minimization problem to obtain a constrained nonlinear programming (NLP) Problem:

$$y_j^u = \underset{y}{\mathrm{argmin}} \rho(y) \qquad \text{Equation (15)}$$

$$= \|\phi(y) - Y_j^u\|^2$$

$$= \phi(y) \cdot \phi(y) - 2Y_j^u \cdot \phi(y) + Y_j^u \cdot Y_j^u$$

subject to: $h_i(y) = 0$ $i = 1, \ldots, N_h$ $g_i(y) \leq 0$ $i = 1, \ldots, N_g$ Here, $h_i(y)=0$ are equality constraints and $N_h$ is the number of equality constraints. Inequality constraints, including simple bound constraints, are given by $g_i(y) \leq 0$ and $N_g$ is the number of inequality constraints. If a kernel order higher than 1 is used and the constraints are general nonlinear constraints, then this becomes a general constrained nonlinear programming problem. For practical simulation models, the number of such constraints can be of the order of millions. In such as case, most common constrained NLP algorithms will not be applicable because of efficiency issues. However, as mentioned above, the fixed-point iteration with successive over relaxation (SOR) can be efficiently used even for very large simulation models for the unconstrained minimization problem of Equation (10). Fixed-point iteration with successive over relaxation (SOR) can be extended to the constrained NLP of Equation (15).

For example, the fixed-point iteration scheme with SOR can be extended to the constrained NLP using an augmented Lagrangian method. The augmented Lagrangian method is a constrained optimization method that combines Lagrange multiplier and penalty function methods. The augmented Lagrangian function for the constrained NLP of Equation (15) can be written as:

$$A(y, \lambda, \mu, r_k) = \rho(y) + \sum_{i=1}^{N_h} \lambda_i h_i(y) + \qquad \text{Equation (16)}$$

$$\sum_{i=1}^{N_g} \mu_i \alpha_i(y) + r_k \sum_{i=1}^{N_h} h_i^2(y) + r_k \sum_{i=1}^{N_g} \alpha_i^2(y);$$

where $$\alpha_i(y) = \max\left\{g_i(y), -\frac{\mu_i}{2r_k}\right\}$$

Here, $\lambda_i$ and $\mu_i$ are Lagrange multipliers corresponding to the equality and inequality constraints, and $r_k$ is the penalty parameter. Function A reduces to the Lagrangian if $r_k=0$ and to the classical penalty function method if all $\lambda_i=0$ and $\mu_i=0$. If the Lagrange multipliers are fixed at their optimal values, the minimization of A gives the solution of Equation (15) in one step for any value of $r_k$. However, since the optimal Lagrange multipliers are not known, an iterative scheme can be used to find the solution. To obtain the solution of the necessary conditions for the minimum of A, the following can be performed:

1. For iteration number k=1, start with arbitrary initial guesses $y^1$ and $r_1$, and set $\lambda^1=0$, $\mu^1=0$.
2. Minimize $A(y,\lambda^k,\mu^k,r_k)$ starting from $y^k$, and find the optimal $y^{*k}$.
3. Check for convergence of $\lambda^k$ and $y^{*k}$. If converged, the constrained optimal solution has been found.
4. If not converged, update the Lagrange multipliers as follows:

$$\lambda_i^{k+1} = \lambda_i^k + 2r_k h_i(y^{*k}) \; i=1, \ldots, N_h$$

$$\mu_i^{k+1} = \mu_i^k + 2r_k a_i(y^{*k}) \; i=1, \ldots, N_g \qquad \text{Equation (17)}$$

5. Update the penalty parameter, where c is a pre-specified constant:

$$r_{k+1} = cr_k, c > 1 \qquad \text{Equation (18)}$$

6. If $r_{k+1} > r_{max}$, set $r_{k+1} = r_{max}$, where $r_{max}$ is a pre-specified constant.

After item 6, the unconstrained minimization of the augmented Lagrangian function $A(y,\lambda^k,\mu^k,r_k)$ for given values of $\lambda^k$, $\mu^k$ and $r_k$ can be performed. This can be efficiently accomplished using the fixed-point iteration method with successive over relaxation. The necessary condition of minimum of $A(y,\lambda^k,\mu^k,r_k)$ gives:

$$\frac{d\psi(y, y)}{dy} - 2\sum_{i=1}^{M} b_{ij} \frac{d\psi(y_i^f, y)}{dy} + \qquad \text{Equation (19)}$$

$$\sum_{i=1}^{N_h} (\lambda_i^k + 2r_k h_i) \frac{dh_i}{dy} + \sum_{i=1}^{N_g} (\mu_i^k + 2r_k \alpha_i) \frac{d\alpha_i}{dy} = 0$$

$$\forall \, j = 1, \ldots, M$$

For the polynomial kernel defined by Equation (13), using a similar approach to that used to derive Equation (14), the fixed-point iteration with SOR for Equation (19) can be written as:

$$y^{n+1} = \frac{\theta}{1+\theta} y^n + \qquad \text{Equation (20)}$$

$$\frac{1}{1+\theta} \left[ \frac{\sum_{i=1}^{M} b_{ij} \sum_{k=1}^{q} \psi(y_i^f \cdot y^n)^{k-1} y_i^f}{\sum_{k=1}^{q} \psi(y^n \cdot y^n)^{k-1}} - \sum_{i=1}^{N_h} (\lambda_i^k + 2r_k h_i) \frac{dh_i}{dy}\bigg|_{y=y^n} - \sum_{i=1}^{N_g} (\mu_i^k + 2r_k \alpha_i) \frac{d\alpha_i}{dy}\bigg|_{y=y^n} \right]$$

$$\forall \, j = 1, \ldots, M$$

Solution of Equation (20) iteratively gives the optimal $y^{*k}$ for the $k^{th}$ iteration of the augmented Lagrangian algorithm. This algorithm can be applied to each ensemble member at each assimilation step to obtain the updated state vectors of the KEnKF in the original space $R^{N_s}$. Further, Equation (20) utilizes the gradient of the constraints with respect to the state variables, and these can be readily obtained simple bound and linear constraints. For more complex constraints, the gradients can also be easily obtained as long as they can be written directly in terms of the state variables of the EnKF. For kernel order 1, the KEnKF is treated like the standard EnKF such that for simple bound and linear constraints, Equation (15) reduces to a quadratic programming problem and can be efficiently solved with standard quadratic programming algorithms.

The above described methods can be implemented in the general context of instructions executed by a computer. Such computer-executable instructions may include programs, routines, objects, components, data structures, and computer software technologies that can be used to perform particular tasks and process abstract data types. Software implementations of the above described methods may be coded in different languages for application in a variety of computing platforms and environments. It will be appreciated that the scope and underlying principles of the above described methods are not limited to any particular computer software technology.

Moreover, those skilled in the art will appreciate that the above described methods may be practiced using any one or a combination of computer processing system configurations, including, but not limited to, single and multi-processor systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program means recorded thereon for directing the computer processor to facilitate the implementation and practice of the above described methods. Such devices and articles of manufacture also fall within the spirit and scope of the present invention.

As will be described, the invention can be implemented in numerous ways, including for example as a method (including a computer-implemented method), a system (including a computer processing system), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 shows an embodiment of computer-implemented method 100 for updating simulation models of a subterranean reservoir. Method 100 includes providing an ensemble of reservoir models representing a subterranean reservoir having non-Gaussian characteristics (101), and providing reservoir data, such as production and injection rates and bottom-hole pressures, from the subterranean reservoir (103). As described herein, "non-Gaussian characteristics" or features refer to permeability, porosity and other reservoir characteristics or features having non-linear, non-Gaussian geospatial distributions. For each of the reservoir models in the ensemble of reservoir models, a constrained optimization with equality constraints and inequality constraints is solved to obtain a constrained optimal solution (105). The constrained optimal solutions are assembled to update the ensemble of reservoir models (107). The updated ensemble of reservoir models is consistent with the reservoir data provided from the subterranean reservoir. Furthermore, the non-Gaussian characteristics of the subterranean reservoir are preserved in the updated ensemble of reservoir models. In some embodiments, the updated ensemble of reservoir models is utilized to forecast or optimize the production performance of the subterranean reservoir (109), which can then be used for reservoir management decisions. In some embodiments, the updated ensemble of reservoir models is transformed into image data representations of the subterranean reservoir, which can then be displayed to a user or operator.

In some embodiments, method 100 uses a generalized ensemble Kalman filter represented by a kernel function, such as the polynomial kernel function shown in Equation (13), to update the simulation models of a subterranean reservoir. In some embodiments, a fixed-point iteration scheme with successive over relaxation, such as defined in Equations (14) and (20), is used for finding the solution of the constrained optimization. In some embodiments, an augmented Lagrangian method, such as defined in Equations (15)-(20), can be used to handle constraints on the state variables of the KEnKF. In particular, the augmented Lagrangian method can utilize Lagrange multipliers that correspond to the equality constraints and inequality constraints.

In some embodiments, the ensemble of reservoir models in method 100 is represented by an initial state vector of static parameters and dynamic state variables. Method 100 can include forecasting forward, up to when the reservoir data from the subterranean reservoir is available for assimilation, the initial state vector to compute a forecasted state vector. The forecasted state vector is then mapped to a feature space and updated in the feature space based upon the reservoir data from the subterranean reservoir. Inverse mapping is performed to map the updated forecasted state vector in the feature space back to the original space.

Figure 2:
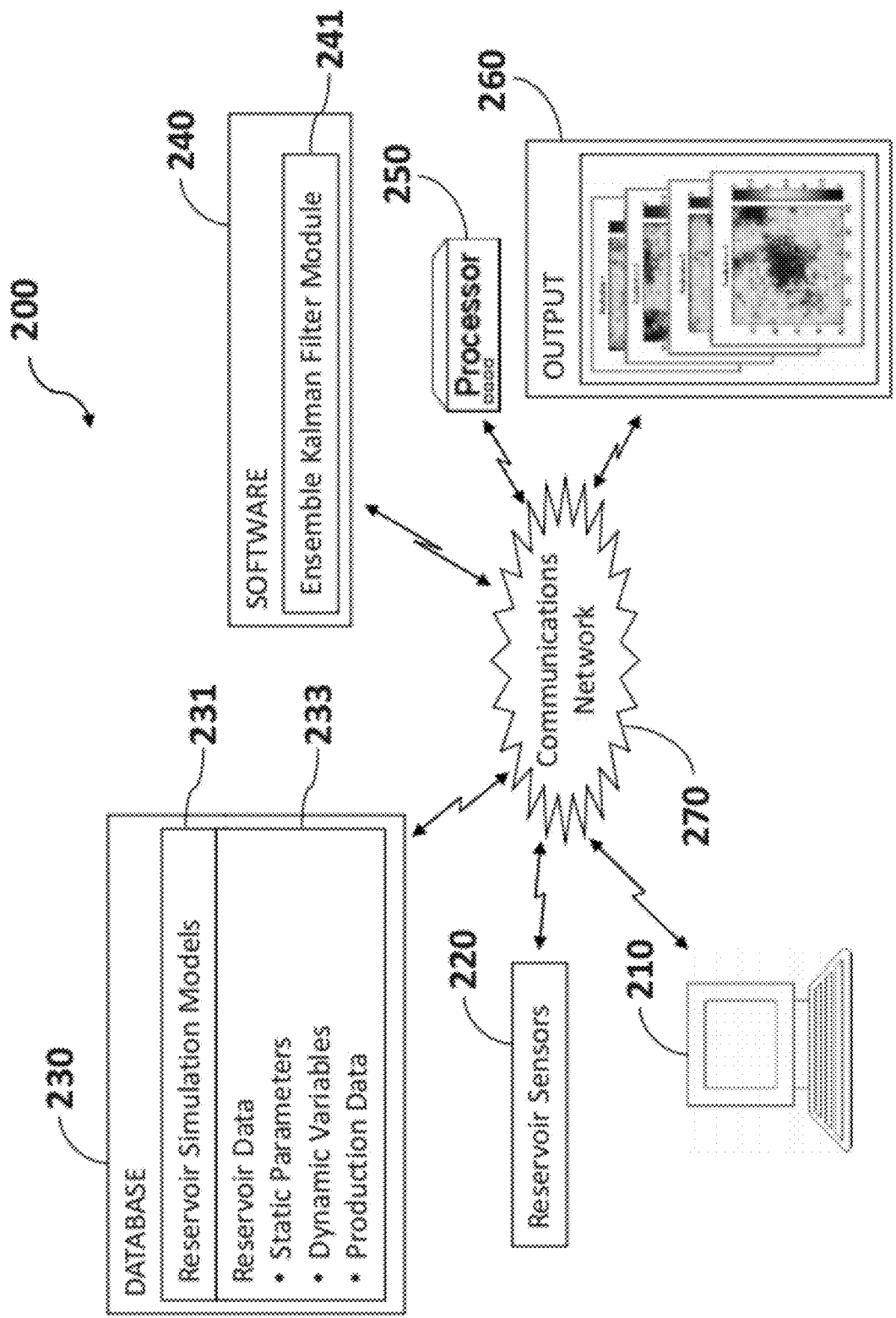
FIG. 2 shows a system for updating reservoir simulation models, according to an embodiment of the present invention.

FIG. 2 illustrates a system 200 for updating simulation models of a subterranean reservoir, such as by using computer-implemented method 100. System 200 includes user interface 210, such that an operator can actively input information and review operations of system 200. User interface 210 can be any means in which a person is capable of interacting with system 200 such as a keyboard, mouse, or touch-screen display. Operator-entered data input into system 200 through user interface 210, can be stored in database 230. Reservoir field data, including for example, well pressure, oil production, water production, gas production, or seismic data, which is received by one or more reservoir sensors 220, can also be input into system 200 for storage in database 230. Additionally, any information generated by system 200 can be stored in database 230.

Database 230 can store user-defined variables, equations and parameters such as equality constraints and inequality constraints, as well as, reservoir production data, and system generated computed solutions. For example, reservoir simulation models 231 and reservoir data 233, such as static variables (permeability fields, porosity fields), dynamic variables (pressure, saturation), and production data (production and injection rates, bottom-hole pressures), are all examples of information that can be stored in database 230. In some embodiments, reservoir simulation models 231 and reservoir data 233 are stored in database 230 as a series of state vectors or an ensemble of realizations for a given assimilation time. An initial ensemble of models can be provided that includes initial reservoir characteristics, at a time $t_0$, derived by operators and/or computer modeling based on initial observations, knowledge or data gathered about the reservoir. The initial ensemble of models may take into account initial estimates of permeability, porosity and other characteristics used to create simulation models of subterranean reservoirs.

System 200 includes a computer program product or software 240 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 240 can include a plurality of modules for performing system tasks such as performing the methods, such as method 100, previously described herein. Processor 250 interprets instructions to execute software 240, as well as, generates automatic instructions to execute software for system 200 responsive to predetermined conditions. Instructions from both user interface 210 and software 240 are processed by processor 250 for operation of system 200. In some embodiments, a plurality of processors can be utilized such that system operations can be executed more rapidly.

An example of a module for software 240 includes, but is not limited to, Ensemble Kalman Filter Module 241. Ensemble Kalman Filter Module 241 is configured to update an ensemble of reservoir models by assembling constrained optimal solutions obtained by solving a constrained optimization with equality constraints and inequality constraints for each of the reservoir models in the ensemble of reservoir models. For example, Ensemble Kalman Filter Module 241 can use a generalized ensemble Kalman filter represented by a kernel function, such as the polynomial kernel function shown in Equation (13), to update the simulation models of a subterranean reservoir. Ensemble Kalman Filter Module 241 can also use a fixed-point iteration scheme with successive over relaxation, such as defined in Equations (14) and (20), for finding the solution for the kernel function. Furthermore, Ensemble Kalman Filter Module 241 can use an augmented Lagrangian method where Lagrange multipliers correspond to the equality constraints and inequality constraints, as defined in Equations (15)-(20), to handle constraints on the state variables of the KEnKF. In general, Ensemble Kalman Filter Module conditions the ensemble of reservoir models to reservoir field data received from reservoir sensors 220 while efficiently handling model constraints. Moreover, the updated ensemble of reservoir models preserves the non-Gaussian characteristics of the reservoir, which enables enhanced accuracy and reliability of reservoir forecast data.

In certain embodiments, system 200 can include reporting unit 260 to provide information to the operator or to other systems (not shown). For example, reporting unit 260 can be a printer, display screen, or a data storage device. However, it should be understood that system 200 need not include reporting unit 260, and alternatively user interface 210 can be utilized for reporting information of system 200 to the operator.

Communication between any components of system 200, such as user interface 210, reservoir sensors 220, database 230, software 240, processor 250 and reporting unit 260, can be transferred over a communications network 270. Communications network 270 can be any means that allows for information transfer. Examples of communications network 270 presently include, but are not limited to, a switch within a computer, a personal area network (PAN), a local area network (LAN), a wide area network (WAN), and a global area network (GAN). Communications network 270 can also include any hardware technology used to connect the individual devices in the network, such as an optical cable or wireless radio frequency.

In operation, an operator initiates software 240, through user interface 210, to perform the methods described herein. Outputs from each software module, such as Ensemble Kalman Filter Module 241, can be stored in database 230. For example, software 240 can utilize Ensemble Kalman Filter Module 241 to solve a constrained optimization with equality constraints and inequality constraints to obtain a constrained optimal solution for a reservoir model in the ensemble of reservoir models. Software 240 can also utilize Ensemble Kalman Filter Module 241 to assemble the constrained optimal solutions for two or more of reservoir models in the ensemble of reservoir models to update the ensemble of reservoir models.

A visual display can be produced, such as through reporting unit 260 or user interface 210, using the updated ensemble of reservoir models. For example, the updated ensemble of reservoir models can be transformed into image data representations of the subterranean reservoir for display to a user or operator. The displayed information can be utilized to forecast or optimize the production performance of the subterranean reservoir, which can then be used for reservoir management decisions.

Example Application of Constrained KEnKF

The above described methods and systems are demonstrated on several example cases. As will be seen, in these examples, such methods and systems better handle various state constraints compared to the standard EnKF with truncation.

The kernel-based EnKF is applied to estimate the permeability field of a synthetic water flooded reservoir and demonstrate the ability of the KEnKF to handle simple bound constraints and a more complex pore volume constraint. The simulation model for this example represents a simple 2D horizontal square reservoir covering an area of 450×450 m² with a thickness of 10 m, and is modeled by a 45×45×1 horizontal 2D grid. The fluid system is a two-phase, incompressible, unit mobility, oil-water system with zero connate water saturation and zero residual oil saturation. The reservoir is initially saturated with oil at a constant pressure of 5800 psi at the top.

Figure 3B:
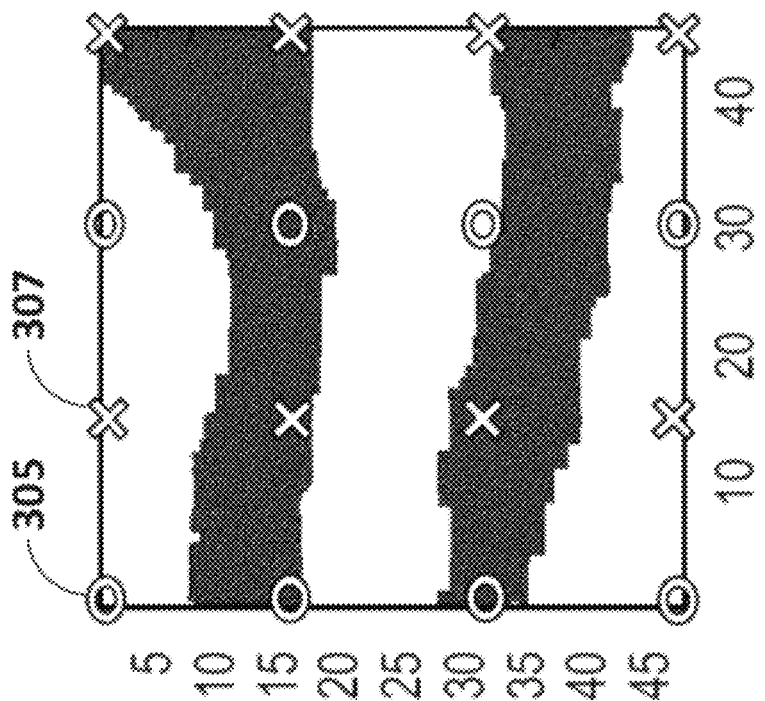
FIGS. 3A and 3B illustrate a channel training image and a reference permeability field created using the training image, respectively, according to embodiments of the present invention.
Figure 3A:
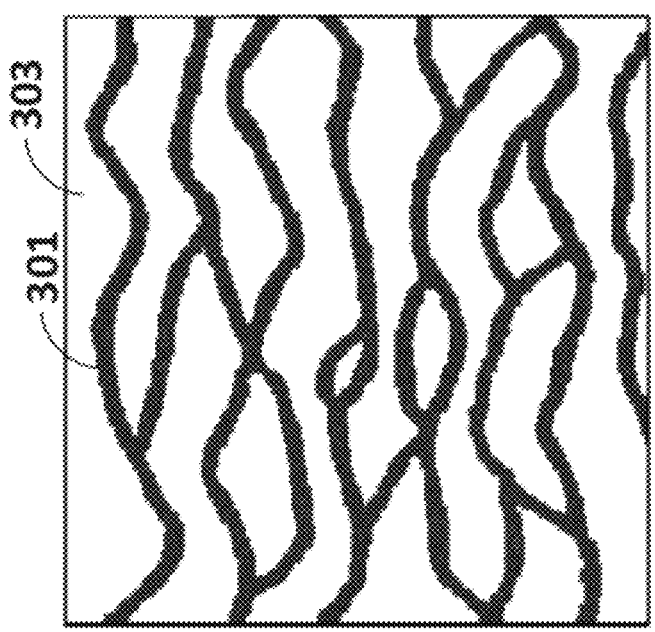

FIG. 3A is a training image created with a multi-point geostatistical software known as Single Normal Equation Simulation (SNESIM), which is a well known software program in both academia and industry. In FIG. 3A, high permeability sand 301 and low permeability background 303 are shown. High permeability sand 301 and low permeability background 303 are assumed to be homogeneous and isotropic. The permeability of high permeability sand 301 is 10 darcies and the permeability of low permeability background 303 is 500 millidarcies.

FIG. 3B shows the reference permeability field or "true" permeability field, which is obtained using the training image shown in FIG. 3A. The permeability field is of a fluvial channelized reservoir and has 8 injectors and 8 producers placed in a line drive pattern. The black circles represent producers 305 and black crosses represent injectors 307. The model is run for 1900 days with the true permeability field. Injectors 307 are under water rate control at 100 bbd and producers 305 under bottom hole pressure (BHP) control at 5789 psi. Injector BHPs, producer oil and water production rates are used as observed data for KEnKF. Gaussian noise with a standard deviation of 1 e-3% of the magnitude of the observations is added to the injection BHPs and production rates, respectively, to emulate measurement errors.

Figure 4:
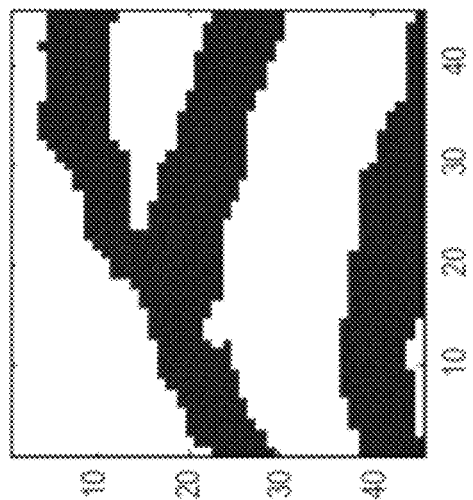
FIG. 4 illustrates four realizations of permeability fields of an initial ensemble of reservoir models created using the training image shown in FIG. 3A, according to an embodiment of the present invention.
Figure 4:
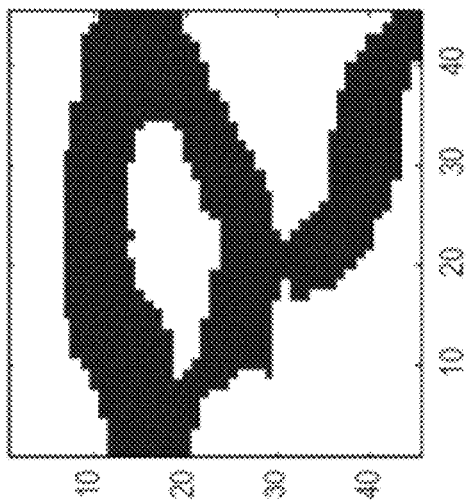
Figure 4:
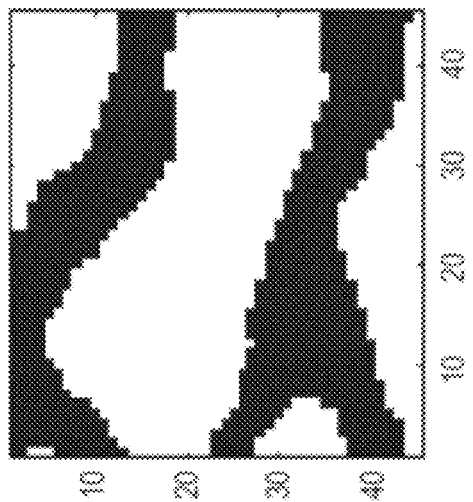
Figure 4:
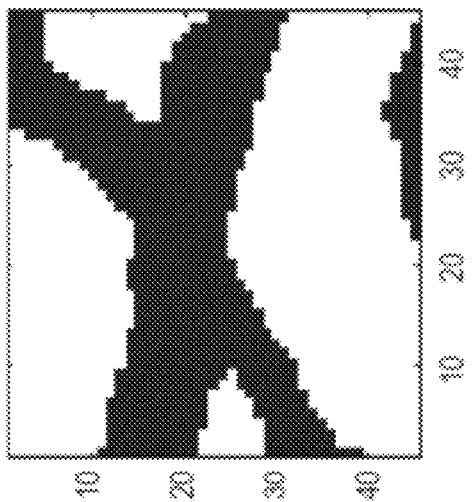

FIG. 4 shows four realizations of an initial ensemble of ten permeability fields obtained using SNESIM with the training image shown in FIG. 3A. The information conveyed by the training image can be thought of as prior geological knowledge of the reservoir. In particular, it is assumed that there are channels in the reservoir (say from outcrop data), and by integrating this knowledge with the observed dynamic data, a posterior estimate of the locations and sinuosity of the channels, conditioned to both the prior knowledge and observations, is obtained. A small ensemble and a very small measurement error are purposefully used in this example, as they result in significant violation of the saturation constraints.

Accordingly, they provide a good case to demonstrate the ability of the constrained kernel EnKF to handle such constraints.

The state variables of the Kalman filter include permeabilities, porosities, pressure and saturations of each grid block, and the observed data at the wells, such as the injector BHPs and producer oil and water rates. The permeabilities and porosities are not directly a part of the state vector, but rather through a parameterization of the form $k=f_1(m)$, $\phi=f_2(m)$, where $f_1$ and $f_2$ are functions of the log and error functions, such that $0 \leq m \leq 1$ for any porosity and permeability. Saturations are constrained to lie between the connate water saturation of 0.1 and residual oil saturation of 0.1 ($0.1 \leq S_{w,o} \leq 0.9$). Grid block pressures are constrained to lie between the injector BHP and the producer BHP. Additionally, a pore volume constraint where the pore volume of the reservoir is retained at a pre-specified value throughout the data assimilation process is applied. This pore volume constraint can be written as:

$$\sum_\Omega V\phi = c \qquad \text{Equation (21)}$$

Here, V is the gridblock volume, $\phi$ is the gridblock porosity, $\Omega$ represents the entire reservoir, and c is the predetermined reservoir pore volume to be satisfied throughout data assimilation. Since porosity is updated during the data assimilation process, this constraint will be violated if nothing is done to explicitly satisfy it.

The constrained KEnKF with order 1 kernel is applied to this ensemble over ten assimilation steps of 190 days each. In this example, higher order kernels are not used as the purpose of this example is to demonstrate the ability of the constrained KEnKF to handle constraints, which is independent of the kernel order. Further, using a kernel of order 1 makes the KEnKF similar to a standard EnKF, which is more ideal for comparison against the standard EnKF formulation with truncation to handle constraints.

Figure 5B:
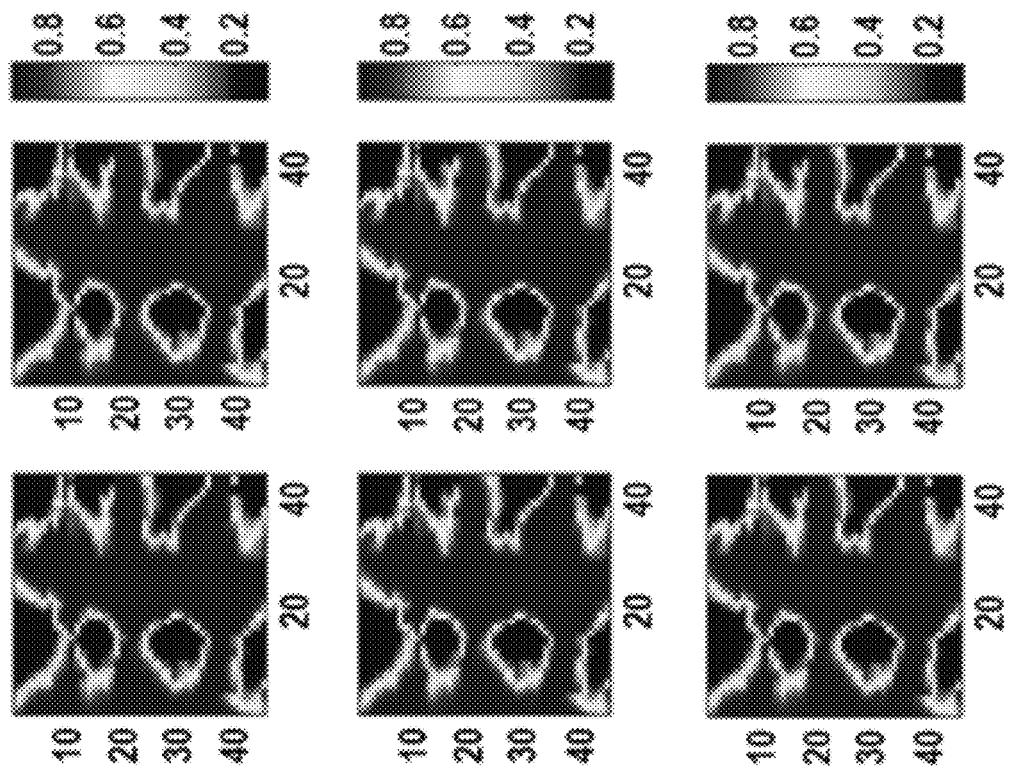
FIG. 5 illustrates water saturation maps for six realizations after a fourth update for the standard EnKF (5A) and the Kernel EnKF (5B), according to an embodiment of the present invention.
Figure 5A:
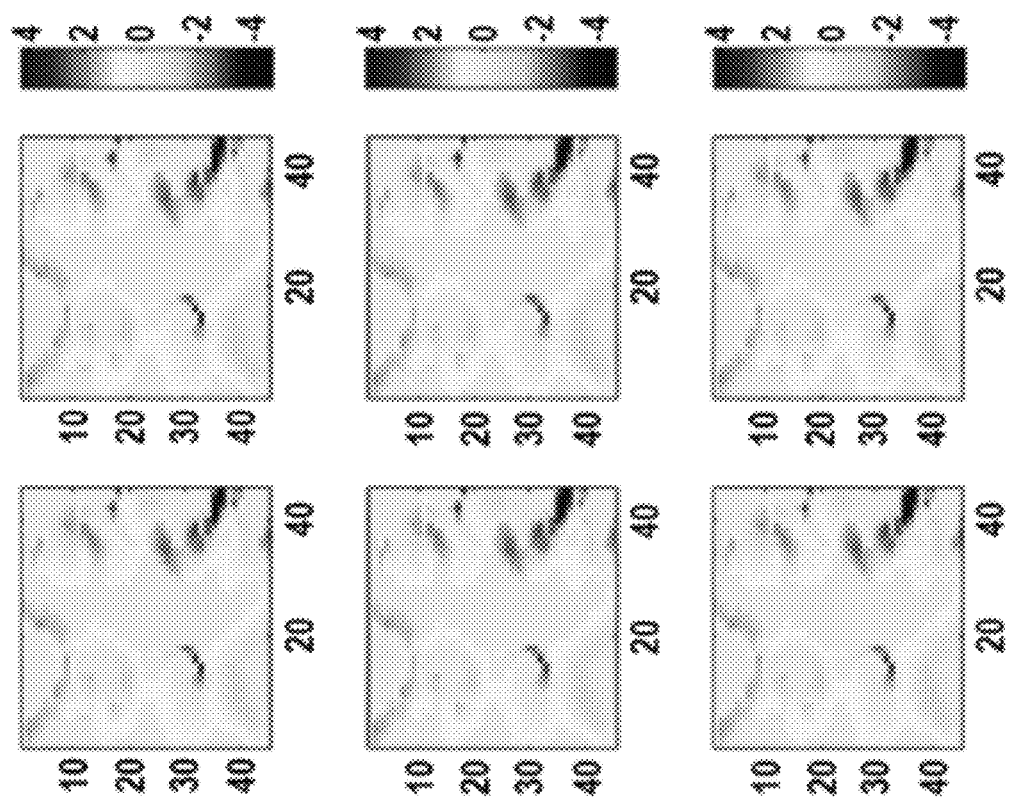

FIG. 5 shows water saturation maps of six ensemble members after the fourth data assimilation step. In FIG. 5A, saturations obtained using the standard EnKF with truncation range from −4 to 4, which is a significant violation of the physical bounds. When the saturations are so far away from the physical bounds, truncation does not make much sense. FIG. 5B shows the saturations obtained with method 100, which will be referred to as the constrained KEnKF hereinafter, remain with the prescribed bounds of 0.1 and 0.9 very well. Similar results are seen for all other assimilation steps.

Figure 6:
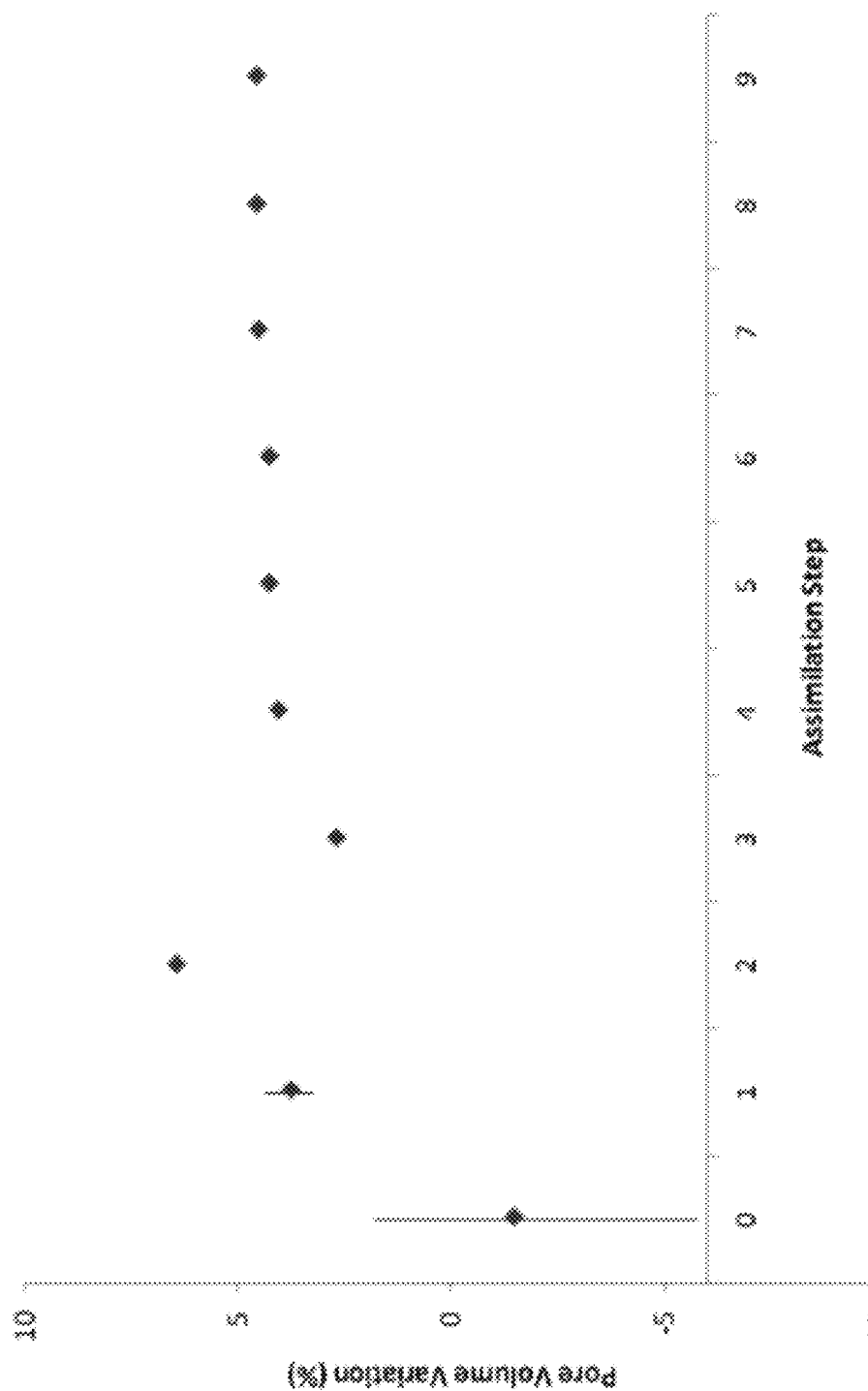
FIG. 6 illustrates a percentage of pore volume constraint violations (mean and range) for an ensemble of reservoir models at each assimilation step obtained using a standard EnKF.
Figure 7:
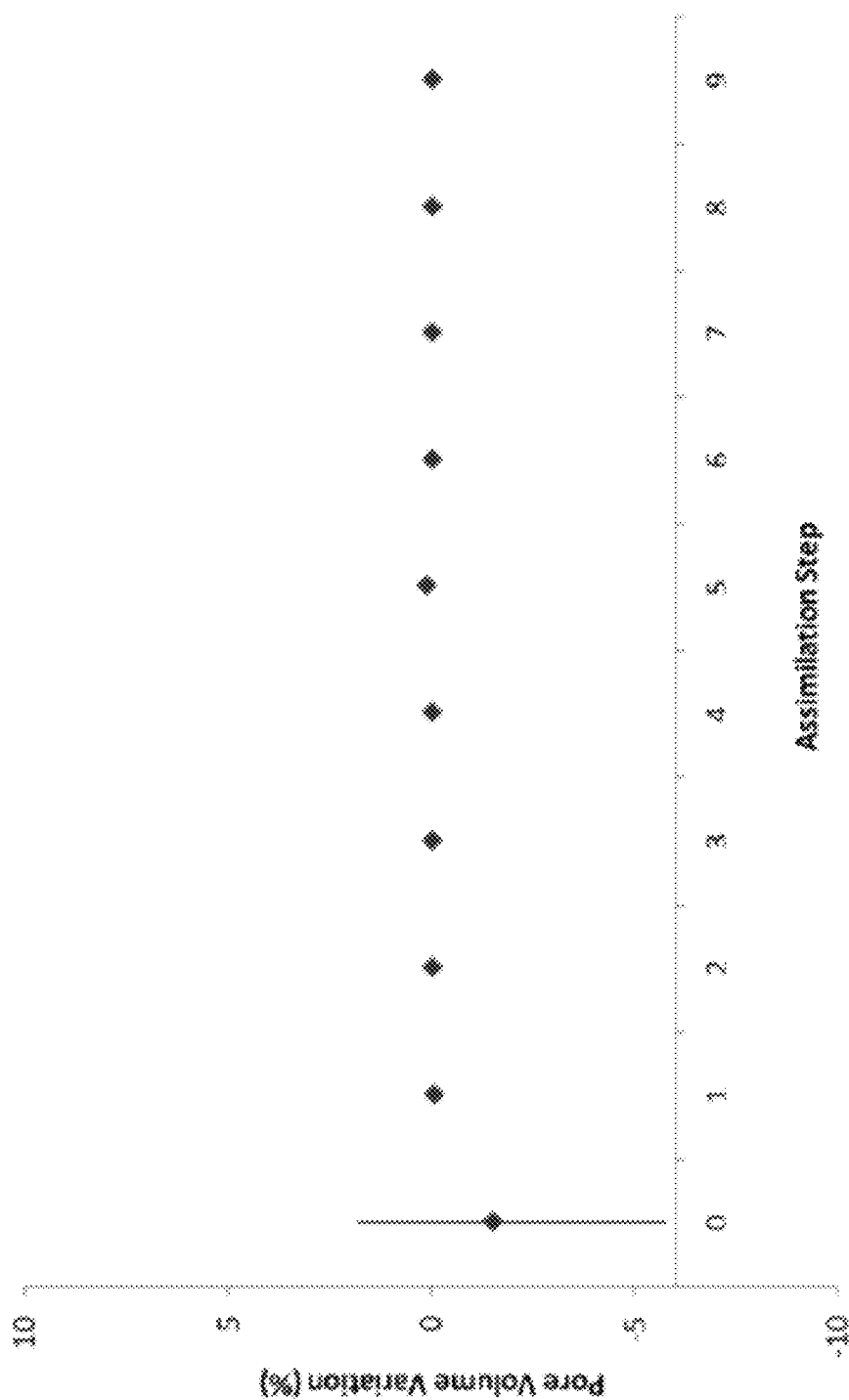
FIG. 7 illustrates a percentage of pore volume constraint violations (mean and range) for an ensemble of reservoir models at each assimilation step obtained using a Kernel EnKF, according to an embodiment of the present invention.

FIGS. 6 and 7 demonstrate the percentage violation of the pore volume constraint for the ensemble (mean and range) at each assimilation step for the standard EnKF, shown in FIG. 5A, and constrained KEnKF, shown in FIG. 5B, respectively. The initial ensemble itself does not satisfy this constraint, with some ensemble members violating it by about 5%. For the standard EnKF (FIG. 5A), the entire ensemble violates the constraint by about 5% in all assimilation steps, with the maximum violation being about 7% in the second assimilation step. Such a violation in a pore volume constraint may not be acceptable if these models are to be used for reserves booking. However, for the constrained KEnKF (FIG. 5B), the constrained violation is very close to 0% for all assimilation steps. Further, as the results demonstrate, the approach works even if the initial ensemble does not satisfy the constraints.

Figure 8:
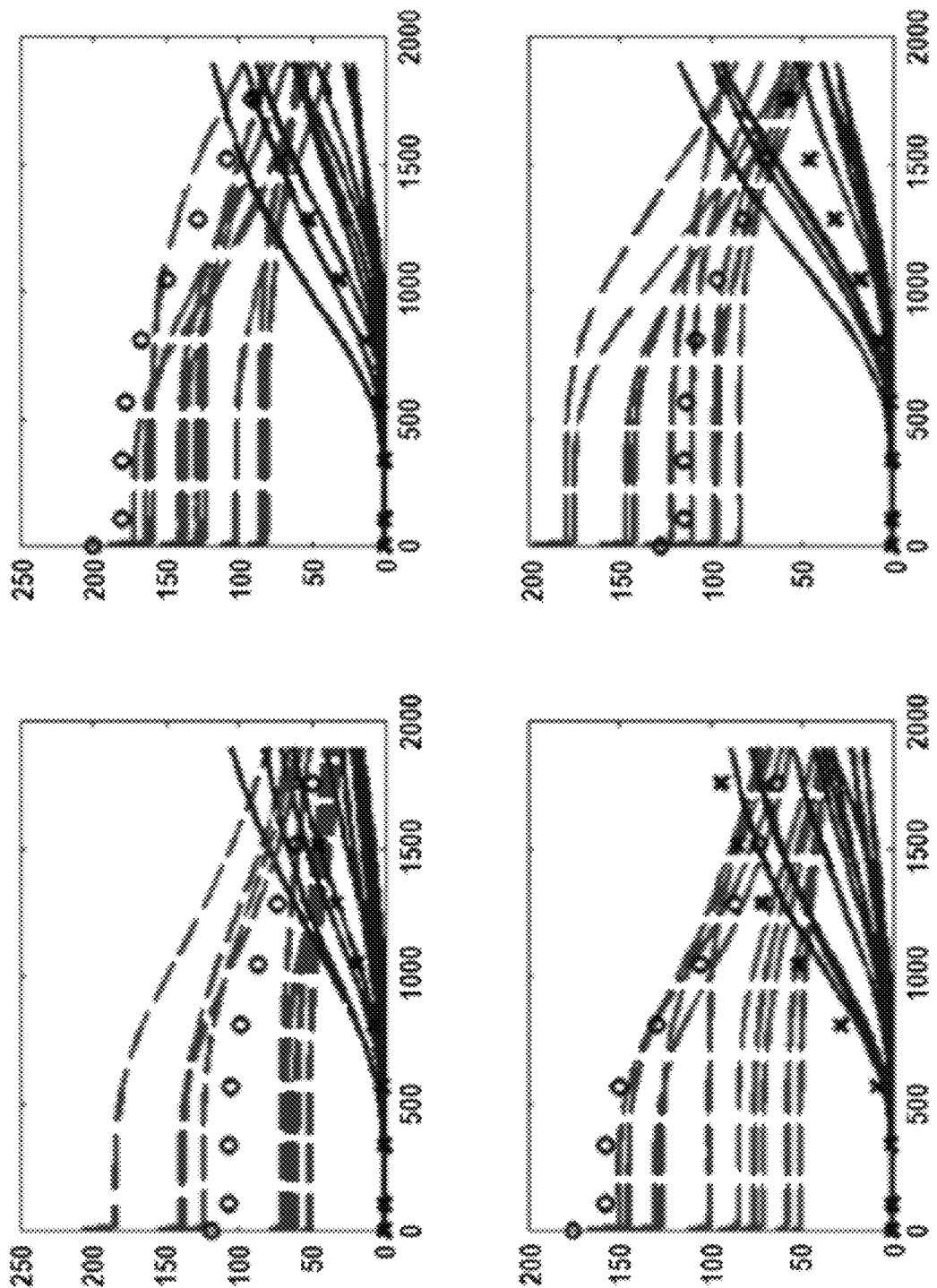
FIG. 8 illustrates oil and water production rates and observed data for an initial ensemble of reservoir models, according to an embodiment of the present invention.
Figure 9:
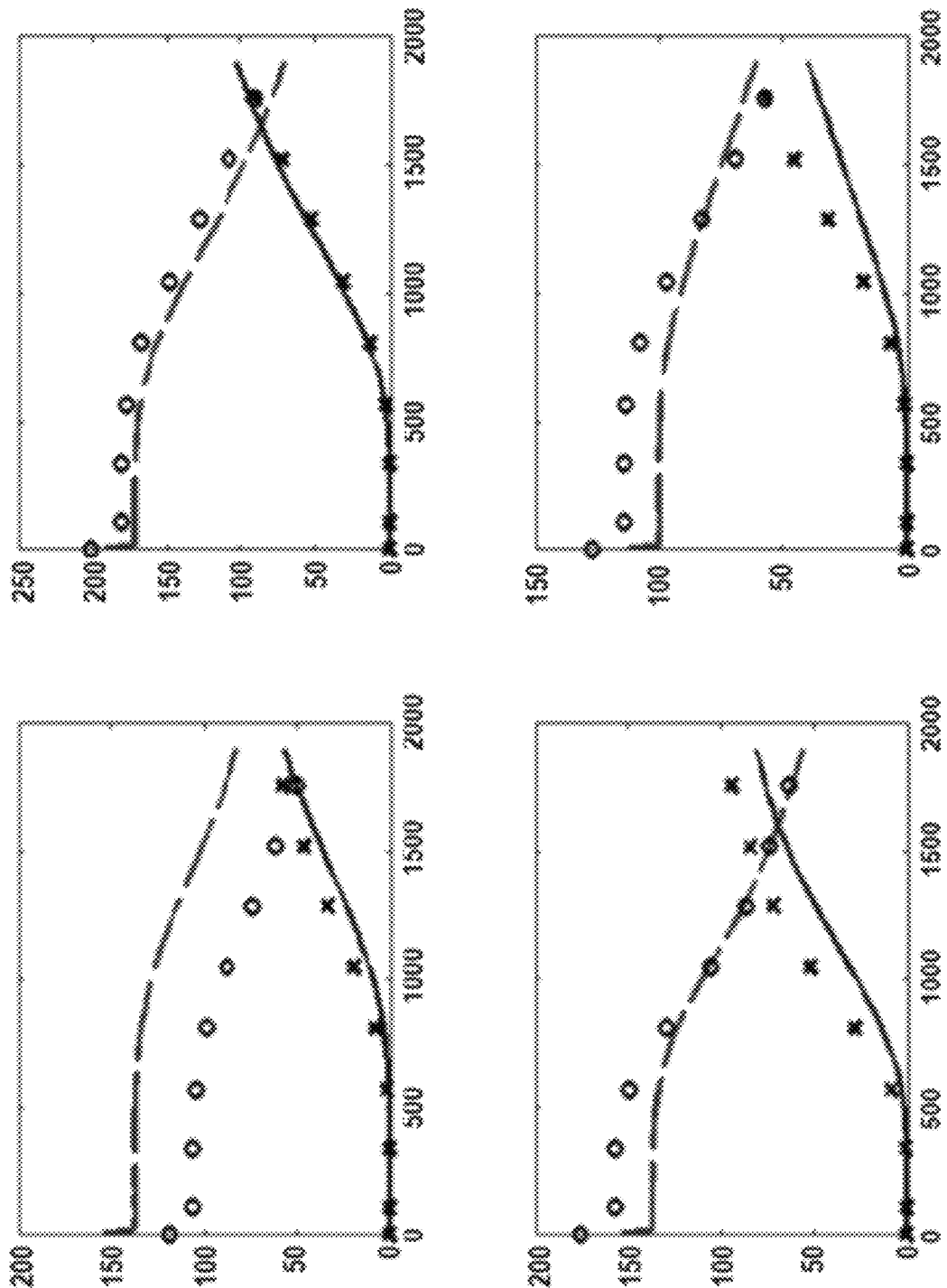
FIG. 9 illustrates oil and water production rates for a final ensemble of reservoir models obtained using a standard EnKF with a 10 member ensemble and observed data.
Figure 10:
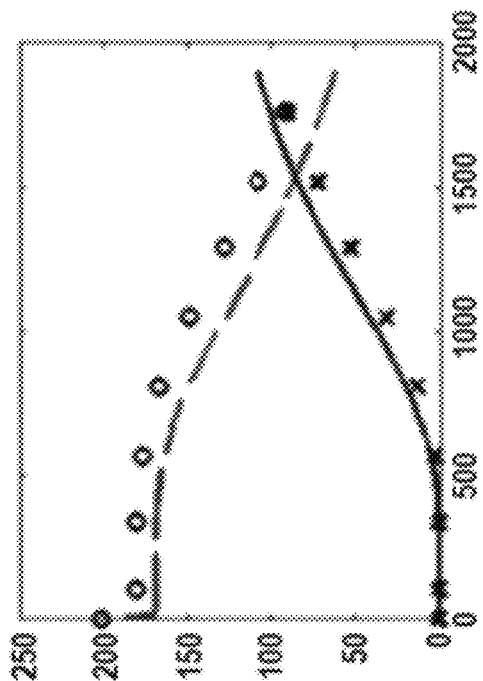
FIG. 10 illustrates oil and water production rates for a final ensemble of reservoir models obtained using a Kernel EnKF with a 10 member ensemble and observed data, according to an embodiment of the present invention.
Figure 10:
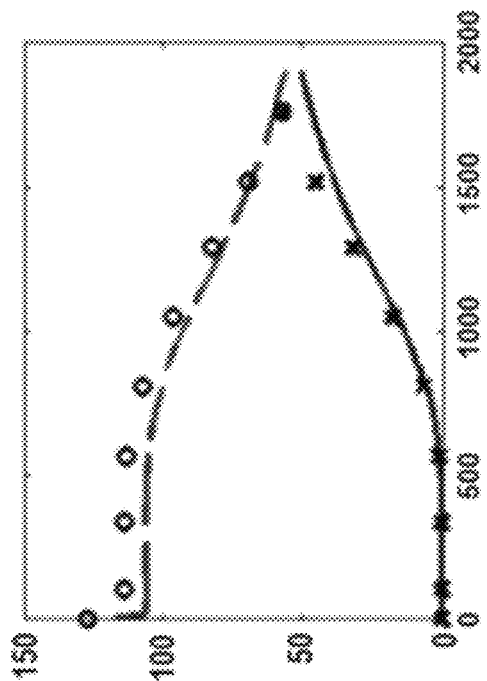
Figure 10:
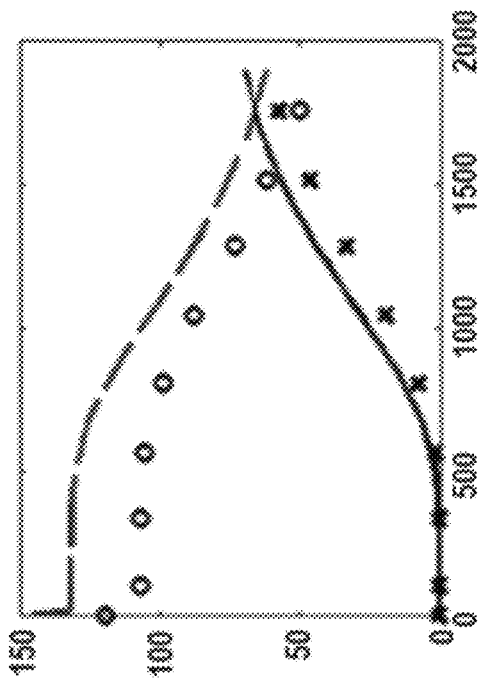
Figure 10:
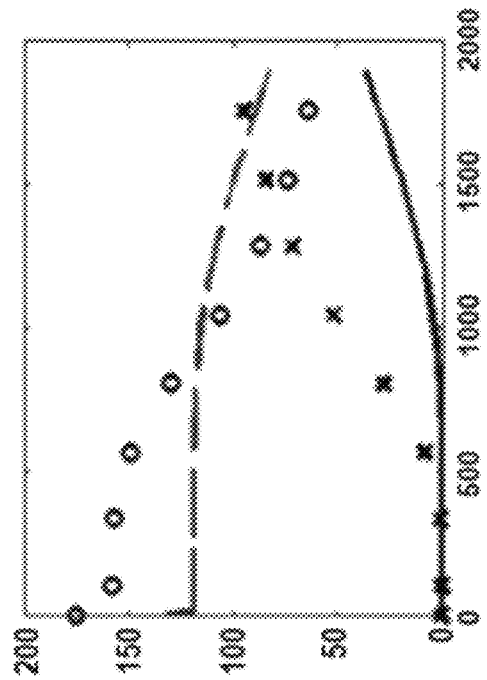

FIGS. 8-10 depict oil production rates (dashed lines) and water production rates (solid lines) obtained with 10 member ensembles. In particular, the initial 10 member ensemble is shown in FIG. 8, the final ensemble using the standard EnKF is shown in FIG. 9, and the final ensemble using the constrained KEnKF is shown in FIG. 10. The observed oil production rates are represented by circles and the observed water production rates are represented by crosses in each of the figures. Although the initial ensemble (FIG. 8) was quite varied, the final ensemble in both cases (FIGS. 9 & 10) collapse and the match is quite poor, which can also be seen in the permeability estimates shown in FIG. 11. Such a result is expected as the ensemble size and measurement errors are very small.

Figure 11B:
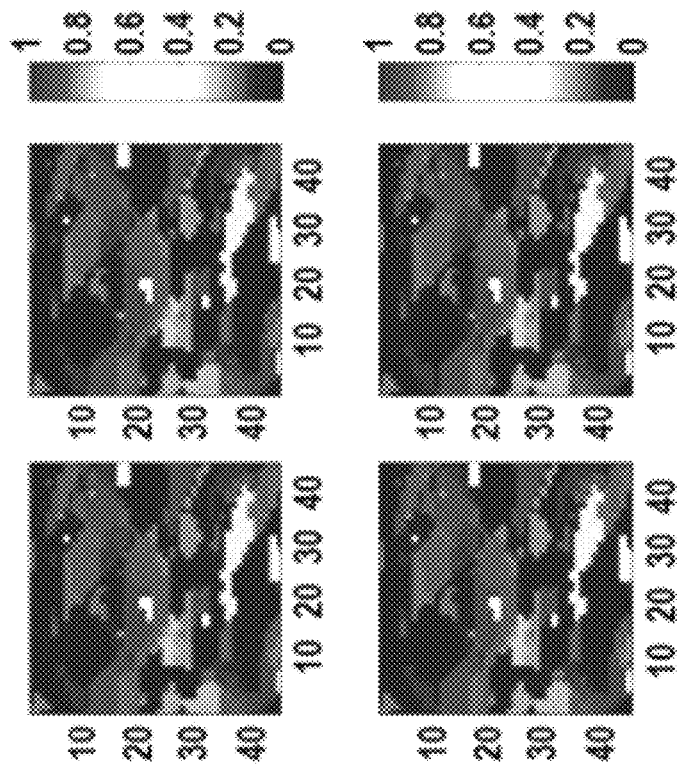
FIG. 11 illustrates four realizations from a final ensemble of reservoir models obtained using the standard EnKF (11A) and kernel EnKF (11B) with a 10 member ensemble, according to an embodiment of the present invention.
Figure 11A:
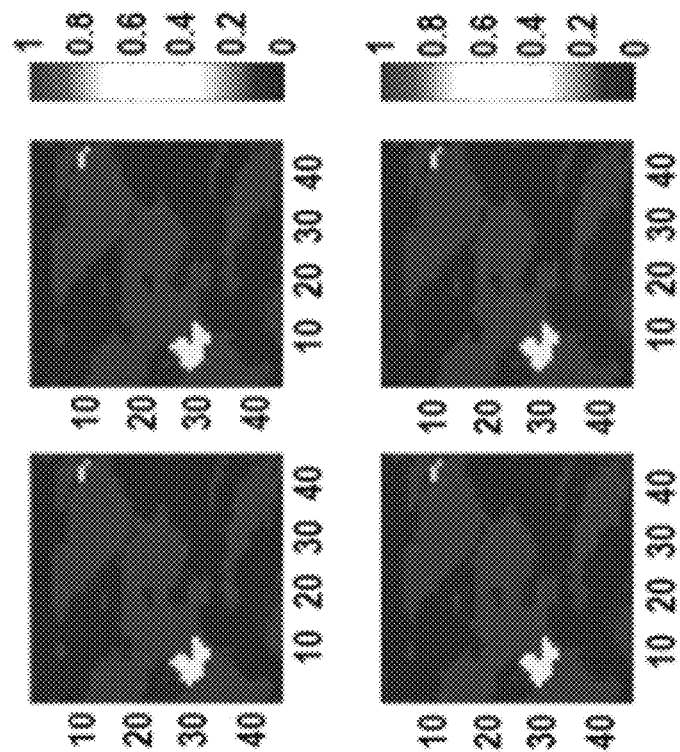

FIG. 11 shows permeability realizations from the final ensembles obtained with 10 member ensembles. In particular, FIG. 11A shows four permeability realizations from the final ensemble using the standard EnKF, which corresponds to FIG. 9. FIG. 11B shows four permeability realizations from the final ensemble using the constrained KEnKF, which corresponds to FIG. 10.

Figure 12A:
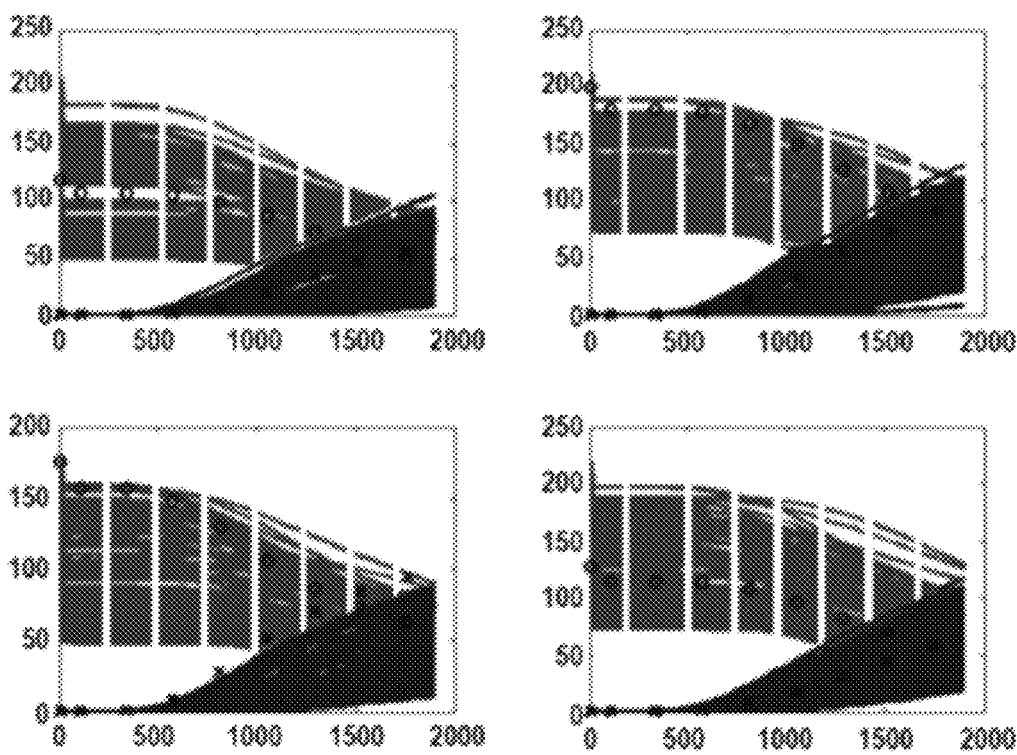
FIG. 12 illustrates oil and water production rates from an initial (12A) and final (12B) ensemble of reservoir models obtained using a Kernel EnKF with 100 members and observed data, according to an embodiment of the present invention.
Figure 12B:
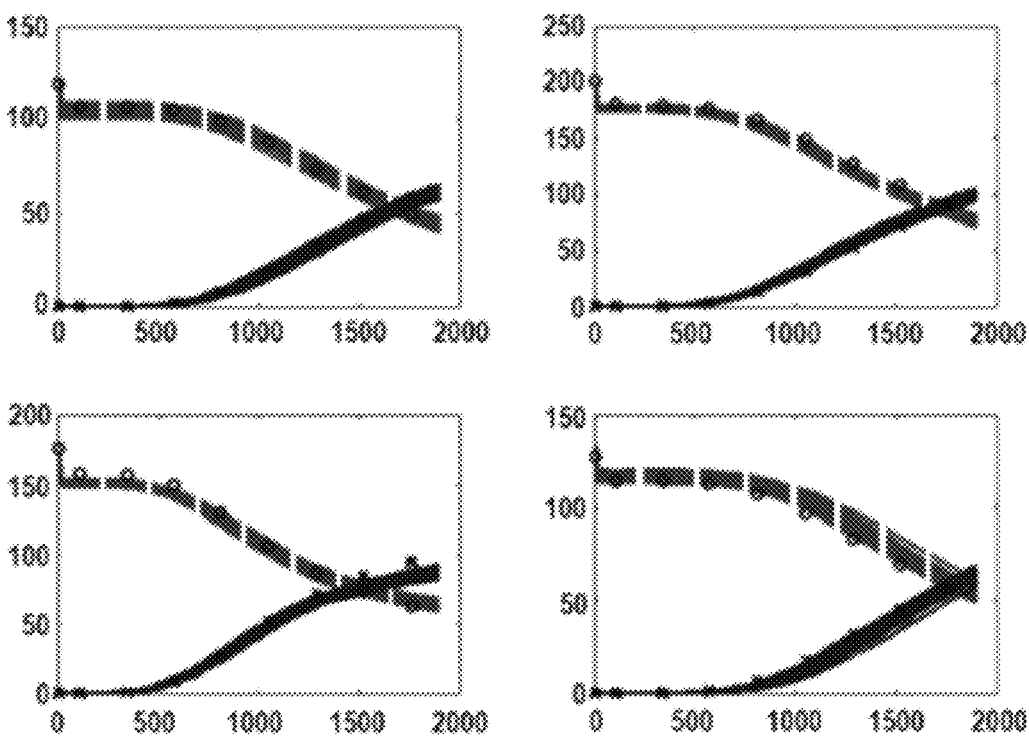

FIG. 12 depict oil production rates (dashed lines) and water production rates (solid lines) obtained with 100 member ensembles using the constrained KEnKF. In particular, FIG. 12A shows oil and water production rates from an initial ensemble of reservoir models and FIG. 12B shows oil and water production rates from the final ensemble of reservoir models. The observed oil production rates are represented by circles and the observed water production rates are represented by crosses in FIG. 12. By increasing the ensemble size to 100 and the standard deviation of the measurement error to 5% of the magnitude of the observed data, a much better match to the production data is obtained.

Figure 13:
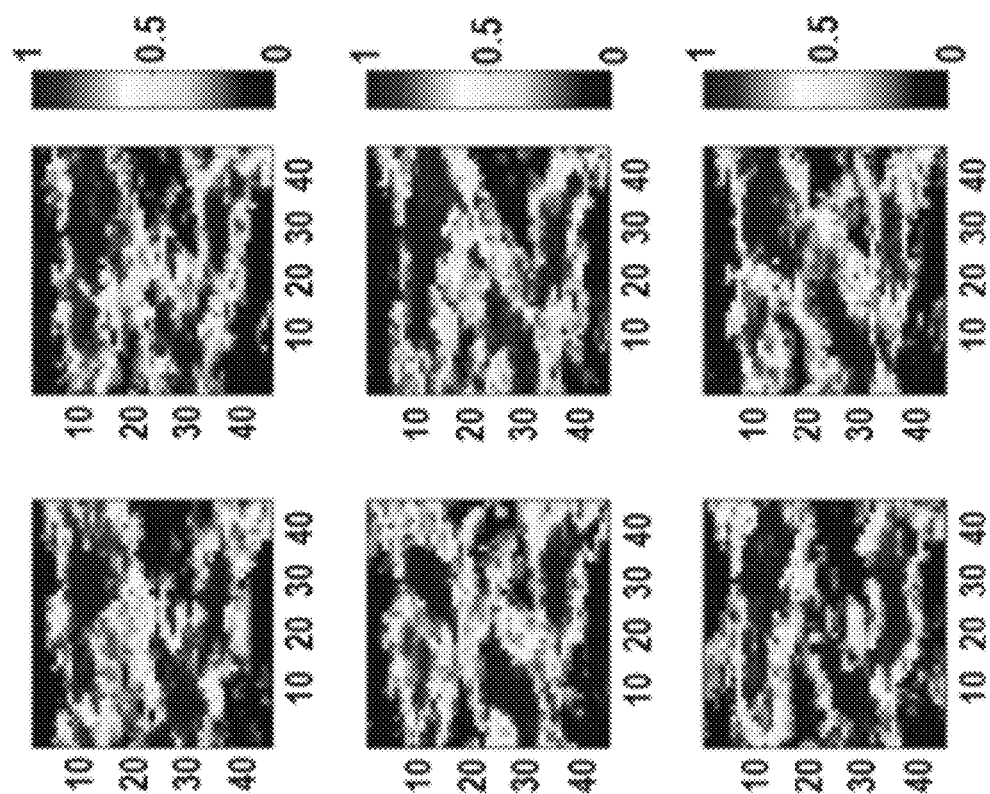
FIG. 13 shows realizations for a final ensemble of reservoir models obtained using a Kernel EnKF with a 100 members, according to an embodiment of the present invention.

FIG. 13 shows six realizations of the final ensemble of reservoir models obtained with a 100 member ensemble using the constrained KEnKF, which was also used in FIG. 12B to produce the oil and water production rates. As can be seen, the permeability estimates are improved by increasing the ensemble size and measurement errors.

The system and methods described herein are therefore demonstrated on the above example case, wherein, constraints arising from physical bounds on saturation and pressure, bounds on porosity and permeability, and a pore volume constraint are present. The results from the constrained KEnKF are compared to the standard EnKF with truncation, and the constrained KEnKF better handles all the different constraints. The kernel formulation of the EnKF therefore, can handle general constraints on the state and other variables of the filter that can arise from physical or other reasons. In the KEnKF, because the Kalman update equation is solved as a minimization problem, constraints can be easily and rigorously handled via solution of a constrained nonlinear programming problem. A combination of fixed point iteration and the augmented Lagrangian method can be used to solve this problem efficiently. With a kernel of order 1, the KEnKF is similar to the standard EnKF and can be used to handle constraints even if high order kernels are not used.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention.

What is claimed is:

1. A computer-implemented method for updating simulation models of a subterranean reservoir, the method comprising:

(a) providing an ensemble of reservoir models representing a subterranean reservoir having non-Gaussian characteristics;
(b) providing reservoir data from the subterranean reservoir;
(c) solving, via a computer, for each of the reservoir models in the ensemble of reservoir models, using a ensemble Kalman filter represented by a kernel function, a constrained optimization with equality constraints and inequality constraints including constraints on the physical bounds of saturation and pressure to obtain a constrained optimal solution, wherein using the ensemble Kalman filter represented by the kernel function includes using an equation, wherein the equation is:

$$y^{n+1} = \frac{\theta}{1+\theta} y^n + \frac{1}{1+\theta} \frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}} \forall\; j = 1, \ldots, M$$

wherein θ is a relaxation factor;
wherein M refers to number of ensemble members of the ensemble of reservoir models;
wherein y is a state vector;
wherein n is an iteration number;
wherein $y^f$ is a forecasted state vector;
wherein q refers to an order of the kernel; and
wherein b is a coefficient of the ensemble Kalman filter represented by the kernel function; and
(d) assembling, via the computer, the constrained optimal solutions to update the ensemble of reservoir models, the updated ensemble of reservoir models being consistent with the reservoir data provided from the subterranean reservoir and preserving the non-Gaussian characteristics of the subterranean reservoir.

2. The computer-implemented method of claim 1, wherein the kernel function is a polynomial kernel function.

3. The computer-implemented method of claim 1, wherein the solving in step (c) further comprises using a fixed-point iteration scheme with successive over relaxation.

4. The computer-implemented method of claim 1, wherein the solving in step (c) further comprises using an augmented Lagrangian method.

5. The computer-implemented method of claim 4, wherein the augmented Lagrangian method utilizes Lagrange multipliers that correspond to the equality constraints and inequality constraints.

6. The computer-implemented method of claim 1, wherein:
the ensemble of reservoir models in step (a) is represented by an initial state vector of static parameters and dynamic state variables; and
the solving in step (c) further comprises:
  (i) forecasting forward, up to when the reservoir data from the subterranean reservoir provided in step (b) is available for assimilation, the initial state vector to compute a forecasted state vector;
  (ii) mapping the forecasted state vector to a feature space;
  (iii) updating the forecasted state vector in the feature space based upon the reservoir data from the subterranean reservoir; and
  (iv) performing inverse mapping to map the updated forecasted state vector in the feature space to the original space.

7. The computer-implemented method of claim 1, further comprising:
(e) forecasting production performance of the subterranean reservoir responsive to the updated ensemble of reservoir models.

8. The computer-implemented method of claim 1, further comprising:
(e) transforming the updated ensemble of reservoir models into image data representations of the subterranean reservoir.

9. A system for updating simulation models of a subterranean reservoir, the system comprising:
a database configured to store data comprising reservoir data from a subterranean reservoir having non-Gaussian characteristics and an ensemble of reservoir models representing the subterranean reservoir;
a computer processor configured to receive the stored data from the database, and to execute software responsive to the stored data; and
a software program, executable on the computer processor, to update the ensemble of reservoir models by assembling constrained optimal solutions obtained by solving, using an ensemble Kalman filter represented by a kernel function, a constrained optimization with equality constraints and inequality constraints including constraints on the physical bounds of saturation and pressure for each of the reservoir models in the ensemble of reservoir models, the updated ensemble of reservoir models being consistent with the reservoir data from the subterranean reservoir and preserving the non-Gaussian characteristics of the subterranean reservoir, wherein using the ensemble Kalman filter represented by the kernel function includes using an equation, wherein the equation is:

$$y^{n+1} = \frac{\theta}{1+\theta} y^n + \frac{1}{1+\theta} \frac{\sum_{i=1}^{M} b_{ij} \sum_{k=1}^{q} k(y_i^f \cdot y^n)^{k-1} y_i^f}{\sum_{k=1}^{q} k(y^n \cdot y^n)^{k-1}} \forall\; j = 1, \ldots, M$$

wherein θ is a relaxation factor;
wherein M refers to number of ensemble members of the ensemble of reservoir models;
wherein y is a state vector;
wherein n is an iteration number;
wherein $y^f$ is a forecasted state vector;
wherein q refers to an order of the kernel; and
wherein b is a coefficient of the ensemble Kalman filter represented by the kernel function.

10. The system of claim 9, wherein the kernel function is a polynomial kernel function.

11. The system of claim 9, wherein:
the ensemble of reservoir models is represented by an initial state vector of static parameters and dynamic state variables; and
the software program is executable on the processor to:
  (a) forecast forward, up to when the reservoir data from the subterranean reservoir is available for assimilation, the initial state vector to compute a forecasted state vector;
  (b) map the forecasted state vector to a feature space;
  (c) update the forecasted state vector in the feature space based upon the reservoir data from the subterranean reservoir; and (d) perform inverse mapping to map the updated forecasted state vector in the feature space to the original space.

12. The system of claim 9, wherein the software program is executable on the processor to solve the constrained optimization with equality constraints and inequality constraints using a fixed-point iteration scheme with successive over relaxation.

13. The system of claim 9, wherein the software program is executable on the processor to solve the constrained optimization with equality constraints and inequality constraints using an augmented Lagrangian method.

14. The system of claim 9, wherein the software program is executable on the processor to forecast production performance of the subterranean reservoir responsive to the updated ensemble of reservoir models.

15. The system of claim 9, wherein the system further comprises a display that communicates with the software program such that the updated ensemble of reservoir models is transformed into image data representations of the subterranean reservoir that are displayed on the display.

16. The system of claim 13, wherein the augmented Lagrangian method has Lagrange multipliers that correspond to the equality constraints and inequality constraints.

17. A computer program product, comprising a non-transitory computer usable medium having a computer readable program code embodied therein, the computer readable program code configured to update an ensemble of reservoir models by assembling constrained optimal solutions obtained by solving, using an ensemble Kalman filter represented by a kernel function, a constrained optimization with equality constraints and inequality constraints including constraints on the physical bounds of saturation and pressure for each of the reservoir models in the ensemble of reservoir models, the updated ensemble of reservoir models being consistent with reservoir data from the subterranean reservoir and preserving the non-Gaussian characteristics of the subterranean reservoir, wherein using the ensemble Kalman filter represented by the kernel function includes using an equation, wherein the equation is:

$$y^{n+1} = \frac{\theta}{1+\theta}y^n + \frac{1}{1+\theta}\frac{\sum_{i=1}^{M}b_{ij}\sum_{k=1}^{q}k(y_i^f \cdot y^n)^{k-1}y_i^f}{\sum_{k=1}^{q}k(y^n \cdot y^n)^{k-1}} \; \forall \; j = 1, \ldots, M$$

wherein $\theta$ is a relaxation factor;
wherein M refers to number of ensemble members of the ensemble of reservoir models;
wherein y is a state vector;
wherein n is an iteration number;
wherein $y^f$ is a forecasted state vector;
wherein q refers to an order of the kernel; and
wherein b is a coefficient of the ensemble Kalman filter represented by the kernel function.

18. The computer program product of claim 17, wherein kernel function is a polynomial kernel function.

19. The computer program product of claim 17, wherein the computer readable program code is configured to solve the constrained optimization with equality constraints and inequality constraints using a fixed-point iteration scheme with successive over relaxation and an augmented Lagrangian method, the augmented Lagrangian method having Lagrange multipliers that correspond to the equality constraints and inequality constraints.

20. The computer program product of claim 17, wherein:
the ensemble of reservoir models is represented by an initial state vector of static parameters and dynamic state variables; and
the computer readable program code is configured to:
(a) forecast forward, up to when the reservoir data from the subterranean reservoir is available for assimilation, the initial state vector to compute a forecasted state vector;
(b) map the forecasted state vector to a feature space;
(c) update the forecasted state vector in the feature space based upon the reservoir data from the subterranean reservoir; and
(d) perform inverse mapping to map the updated forecasted state vector in the feature space to the original space.

* * * * *